US012438287B2

(12) United States Patent
Guan et al.

(10) Patent No.: US 12,438,287 B2
(45) Date of Patent: Oct. 7, 2025

(54) WIRELESS ROUTER AND CONTROL METHOD THEREOF

(71) Applicant: Honor Device Co., Ltd., Shenzhen (CN)

(72) Inventors: Qiao Guan, Shenzhen (CN); Zhijun Zhang, Shenzhen (CN); Kunpeng Wei, Shenzhen (CN); Yi Wang, Shenzhen (CN); Jia Hou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/264,912

(22) PCT Filed: Jan. 3, 2023

(86) PCT No.: PCT/CN2023/070198
§ 371 (c)(1),
(2) Date: Aug. 9, 2023

(87) PCT Pub. No.: WO2023/160255
PCT Pub. Date: Aug. 31, 2023

(65) Prior Publication Data

US 2025/0007181 A1 Jan. 2, 2025

(30) Foreign Application Priority Data

Feb. 28, 2022 (CN) ........................ 202210191453.1

(51) Int. Cl.
*H01Q 21/28* (2006.01)
*H01Q 1/12* (2006.01)
(Continued)

(52) U.S. Cl.
CPC ............. *H01Q 21/28* (2013.01); *H01Q 1/125* (2013.01); *H01Q 1/2291* (2013.01); *H01Q 1/36* (2013.01)

(58) Field of Classification Search
CPC ........ H01Q 1/125; H01Q 1/2291; H01Q 1/36; H01Q 3/00; H01Q 3/02; H01Q 3/04; H01Q 21/28
See application file for complete search history.

(56) References Cited

U.S. PATENT DOCUMENTS 7,239,894 B2 7/2007 Corbett et al.
11,482,768 B2 10/2022 Liu
(Continued)

FOREIGN PATENT DOCUMENTS

CN 202696915 U 1/2013
CN 103618676 A 3/2014
(Continued)

*Primary Examiner* — Hoang V Nguyen
(74) *Attorney, Agent, or Firm* — Conley Rose, P.C.

(57) ABSTRACT

A wireless router and a control method thereof, to improve application universality of the wireless router. The wireless router includes an omnidirectional antenna, a directional antenna, and a driving apparatus. The driving apparatus is connected to the directional antenna, the driving apparatus is configured to drive the directional antenna to rotate, so that a beam direction of the directional antenna coincides with a direction of a target beam in a beam lookup table, and the target beam is capable of covering a target device. The beam lookup table includes a set formed by beams when the directional antenna rotates to a plurality of different orientations under driving by the driving apparatus.

20 Claims, 26 Drawing Sheets

(51) Int. Cl.

| | |
|---|---|
| ***H01Q 1/22*** | (2006.01) |
| ***H01Q 1/36*** | (2006.01) |

(56) References Cited

U.S. PATENT DOCUMENTS

| | | | | |
|---|---|---|---|---|
| 2012/0056784 | A1 | 3/2012 | Xie et al. | |
| 2013/0050021 | A1 * | 2/2013 | Wang | H01Q 3/04 342/359 |

FOREIGN PATENT DOCUMENTS

| | | | |
|---|---|---|---|
| CN | 103746924 | A | 4/2014 |
| CN | 102428607 | B | 9/2014 |
| CN | 204167483 | U | 2/2015 |
| CN | 104917537 | A | 9/2015 |
| CN | 205377920 | U | 7/2016 |
| CN | 108701897 | A | 10/2018 |
| CN | 109041069 | A | 12/2018 |
| CN | 111277293 | A | 6/2020 |
| EP | 1482654 | A2 | 12/2004 |

* cited by examiner

WIRELESS ROUTER AND CONTROL METHOD THEREOF

CROSS-REFERENCE TO RELATED APPLICATIONS

This is a U.S. National Stage of International Application No. PCT/CN2023/070198 filed on Jan. 3, 2023, which claims priority to Chinese Patent Application No. 202210191453.1, filed with the China National Intellectual Property Administration on Feb. 28, 2022, both of which are incorporated herein by reference in their entireties.

TECHNICAL FIELD

This application relates to the field of communication device technologies, and in particular, to a wireless router and a control method thereof.

BACKGROUND

Currently, a wireless router (for example, a home wireless router) is applied to user Internet access and wireless coverage. The wireless router may be considered as a forwarder, and may forward a wireless or wired broadband network signal to a nearby wireless network device (for example, a notebook computer, a mobile phone, a tablet computer, a smart television, or a wireless router) by using an antenna.

Existing wireless routers mostly use omnidirectional antennas to implement wireless coverage. The omnidirectional antenna shows homogeneous radiation of 360° in a horizontal antenna pattern, namely, directionless as is commonly referred to. However, a gain of the omnidirectional antenna is small, which is usually only 3 dBi~6 dBi, a communication distance is short, and a signal forwarding speed is low. Consequently, these wireless routers can serve only common user equipment, and cannot serve a medium/long-distance weak field device or a high-speed device. Therefore, application of the existing wireless routers is limited.

SUMMARY

Embodiments of this application provide a wireless router and a control method thereof, to resolve a problem of how to improve application universality of the wireless router.

To achieve the foregoing objective, the following technical solutions are used in the embodiments of this application.

According to a first aspect, a wireless router is provided. The wireless router includes an omnidirectional antenna, a directional antenna, and a driving apparatus. The driving apparatus is connected to the directional antenna, the driving apparatus is configured to drive the directional antenna to rotate, so that a beam direction of the directional antenna coincides with a direction of a target beam in a beam lookup table, and the target beam is capable of covering a target device. The beam lookup table includes a set formed by beams when the directional antenna rotates to a plurality of different orientations under driving of the driving apparatus.

In this embodiment of this application, on a basis of meeting access of a common device by using the omnidirectional antenna, access of a medium/long-distance weak field device and a high-speed device can be met by using the directional antenna that has a high gain and an adjustable beam direction. In this way, application universality of the wireless router can be improved. Based on this, in a process of using the driving apparatus to drive the directional antenna to rotate, the directional antenna can be adjusted to a position for covering the target device, provided that the beam direction of the directional antenna coincides with the direction of the target beam in a limited quantity of beams in the beam lookup table, and there is no need to traverse all orientations to which the directional antenna can rotate under driving of the driving apparatus. Therefore, control difficulty is low, and power consumption and a delay are low.

In a possible implementation of the first aspect, the driving apparatus is configured to drive the directional antenna to rotate around a first axis. A plurality of beams in the beam lookup table form a plurality of beam subsets, the plurality of beam subsets are arranged in a circumferential direction of the first axis, and the beam subset includes at least a first beam whose direction is perpendicular to the first axis. In this way, when the directional antenna rotates until the beam direction coincides with directions of the plurality of first beams, the directional antenna can cover the target device in a horizontal plane. The wireless router may be applied to a large flat building structure.

In a possible implementation of the first aspect, in the circumferential direction of the first axis, an included angle between first beams in two adjacent beam subsets is greater than or equal to a stepping precision angle used by the driving apparatus to perform driving around the first axis, and is less than or equal to a first beam angle of the directional antenna. The first beam angle is an included angle between two directions in which radiation powers decrease by a first preset threshold and that are located on two sides of a maximum radiation direction in a plane perpendicular to the first axis when the beam direction of the directional antenna is perpendicular to the first axis. In this way, the beam lookup table is complete within a 360° range in the circumferential direction of the first axis, and the beam direction of the directional antenna can be adjusted to a plurality of positions within the 360° range in the circumferential direction of the first axis, so that the directional antenna can cover the target device at any position in the horizontal plane.

In a possible implementation of the first aspect, in the circumferential direction of the first axis, an included angle between first beams in two adjacent beam subsets is equal to a first beam angle of the directional antenna. In this way, a quantity of beams in the beam lookup table is small, control difficulty is low, and power consumption and a delay are low.

In a possible implementation of the first aspect, the driving apparatus is further configured to drive the directional antenna to rotate around a second axis; and the second axis is perpendicular to the first axis, and the second axis is perpendicular to the beam direction of the directional antenna. The beam subset includes a plurality of beams arranged in a circumferential direction of the second axis, and the first beam is one of the plurality of beams. In this way, the plurality of beams in the beam lookup table are distributed within a three-dimensional space range. When the directional antenna rotates until the beam direction coincides with directions of the plurality of beams within the three-dimensional space range, the directional antenna can cover the target device within the three-dimensional space range. The wireless router may be applied to building structures such as a villa and a duplex.

In a possible implementation of the first aspect, in the circumferential direction of the second axis, an included angle between two adjacent beams in the beam subset is greater than or equal to a stepping precision angle used by a second driving apparatus to perform driving around the second axis, and is less than or equal to a second beam angle of the directional antenna. The second beam angle is an included angle between two directions in which radiation powers decrease by a second preset threshold and that are located on two sides of a maximum radiation direction in a plane perpendicular to the second axis when the beam direction of the directional antenna is perpendicular to the first axis. In this way, the beam lookup table is complete within the three-dimensional space range, and the beam direction of the directional antenna can be adjusted to a plurality of positions within the three-dimensional space range, so that the directional antenna can cover the target device at any position within the three-dimensional space range.

In a possible implementation of the first aspect, in the circumferential direction of the second axis, an included angle between two adjacent beams in the beam subset is equal to a second beam angle of the directional antenna. In this way, a quantity of beams in the beam lookup table is small, control difficulty is low, and power consumption and a delay are low.

In a possible implementation of the first aspect, the wireless router further includes a controller and a detection system. The controller is electrically connected to the driving apparatus, and the controller is configured to control the driving apparatus to drive the directional antenna to sequentially rotate to the plurality of orientations, so that the beam direction of the directional antenna separately coincides with directions of the plurality of beams in the beam lookup table. The detection system is configured to: when the beam direction of the directional antenna separately coincides with the directions of the plurality of beams in the beam lookup table, detect signal quality received by the directional antenna from the target device. The signal quality may be evaluated based on at least one of indicators such as received signal strength, an error rate, a throughput rate, or channel status information. When the signal quality is comprehensively evaluated based on a plurality of indicators in these indicators, the plurality of indicators may be weighted to obtain a comprehensive indicator for evaluation, or may be separately evaluated. This is not specifically limited herein. The controller is electrically connected to the detection system, and the controller is further configured to determine the target beam in the beam lookup table based on a plurality of pieces of signal quality obtained by the detection system through detection, and control the driving apparatus to drive the directional antenna to rotate, so that the beam direction of the directional antenna coincides with the direction of the target beam in the beam lookup table. The wireless router has a simple structure and requires no dedicated positioning apparatus. Therefore, costs are low.

In a possible implementation of the first aspect, the wireless router further includes a positioning apparatus and a controller. The positioning apparatus is configured to acquire position information of the target device. The controller is electrically connected to the positioning apparatus, and the controller is configured to determine the target beam in the beam lookup table based on the position information acquired by the positioning apparatus, and control the driving apparatus to drive the directional antenna to rotate, so that the beam direction of the directional antenna coincides with the direction of the target beam in the beam lookup table. The wireless router does not need to look up the target beam through polling, and can quickly determine the target beam with a fast response and a short delay time.

In a possible implementation of the first aspect, the positioning apparatus is a UWB antenna.

In a possible implementation of the first aspect, the wireless router further includes a radio frequency transceiver system, the radio frequency transceiver system has a plurality of signal output ends, there is at least one omnidirectional antenna, there is at least one directional antenna, a sum of a quantity of omnidirectional antennas and a quantity of directional antennas is greater than a quantity of signal output ends of the radio frequency transceiver system, a toggle switch is further disposed between the plurality of signal output ends of the radio frequency transceiver system and both of the omnidirectional antenna and the directional antenna, and the toggle switch is configured to select the plurality of signal output ends of the radio frequency transceiver system to be respectively electrically connected to a plurality of antennas from the at least one omnidirectional antenna and the at least one directional antenna, to implement switching among a plurality of use scenarios of the wireless router.

According to a second aspect, a control method of a wireless router is further provided. The wireless router includes an omnidirectional antenna, a directional antenna, and a driving apparatus, the driving apparatus is connected to the directional antenna, and the control method includes:

acquiring signal quality received by the omnidirectional antenna from a first target device, to obtain first signal quality; and driving, by using the driving apparatus when the first signal quality is less than a third preset threshold, the directional antenna to rotate, so that a beam direction of the directional antenna coincides with a direction of a target beam in a beam lookup table, where the target beam is capable of covering the first target device. The beam lookup table includes a set formed by beams when the directional antenna rotates to a plurality of different orientations under driving of the driving apparatus.

In this way, on a basis of meeting access of a common device by using the omnidirectional antenna, access of a medium/long-distance weak field device and a high-speed device can be met by using the directional antenna that has a high gain and an adjustable beam direction. In this way, application universality of the wireless router can be improved. Based on this, in a process of using the driving apparatus to drive the directional antenna to rotate, the directional antenna can be adjusted to a position for covering the target device, provided that the beam direction of the directional antenna coincides with the direction of the target beam in a limited quantity of beams in the beam lookup table, and there is no need to traverse all orientations to which the directional antenna can rotate under driving of the driving apparatus. Therefore, control difficulty is low, and power consumption and a delay are low.

In a possible implementation of the second aspect, before the driving, by using the driving apparatus when the first signal quality is less than a third preset threshold, the directional antenna to rotate, so that a beam direction of the directional antenna coincides with a direction of a target beam in a beam lookup table, the control method further includes: determining the target beam in the beam lookup table. In this way, the target beam can be automatically searched for with a low delay and high efficiency.

In a possible implementation of the second aspect, the determining the target beam in the beam lookup table includes:

driving, by using the driving apparatus, the directional antenna to sequentially rotate to the plurality of orientations, so that the beam direction of the directional antenna separately coincides with directions of a plurality of beams in the beam lookup table, and detecting, when the beam direction of the directional antenna separately coincides with the directions of the plurality of beams in the beam lookup table, signal quality received by the directional antenna from the first target device, to obtain a plurality of pieces of signal quality; and determining the target beam in the beam lookup table based on the plurality of pieces of signal quality.

In this way, the target beam is determined in the beam lookup table in a polling lookup manner. This method is simple and easy to implement.

In a possible implementation of the second aspect, the driving apparatus is configured to drive the directional antenna to rotate around a first axis; the plurality of beams in the beam lookup table form a plurality of beam subsets, the plurality of beam subsets are arranged in a circumferential direction of the first axis, and the beam subset includes at least a first beam whose direction is perpendicular to the first axis.

The driving, by using the driving apparatus, the directional antenna to sequentially rotate to the plurality of orientations, so that the beam direction of the directional antenna separately coincides with directions of a plurality of beams in the beam lookup table, and detecting, when the beam direction of the directional antenna separately coincides with the directions of the plurality of beams in the beam lookup table, signal quality received by the directional antenna from the first target device, to obtain a plurality of pieces of signal quality includes:

driving, by using the driving apparatus, the directional antenna to rotate around the first axis, so that the beam direction of the directional antenna separately coincides with directions of the first beams in the plurality of beam subsets, and detecting, when the beam direction of the directional antenna separately coincides with the directions of the first beams in the plurality of beam subsets, the signal quality received by the directional antenna from the first target device, to obtain a plurality of pieces of third signal quality, where because each beam subset includes a first beam, the first beams in the plurality of beam subsets refer to a plurality of first beams, and the plurality of first beams respectively belong to the plurality of beam subsets; and determining a target beam subset based on the plurality of pieces of third signal quality, where the target beam belongs to the target beam subset.

In this way, when the directional antenna rotates until the beam direction separately coincides with the directions of the plurality of first beams, the directional antenna can cover the target device in a horizontal plane. The wireless router may be applied to a large flat building structure.

In a possible implementation of the second aspect, the driving apparatus is further configured to drive the directional antenna to rotate around a second axis; the second axis is perpendicular to the first axis, and the second axis is perpendicular to the beam direction of the directional antenna; and the beam subset includes a plurality of beams arranged in a circumferential direction of the second axis, and the first beam is one of the plurality of beams.

After the determining a target beam subset, the driving, by using the driving apparatus, the directional antenna to sequentially rotate to the plurality of orientations, so that the beam direction of the directional antenna separately coincides with directions of a plurality of beams in the beam lookup table, and detecting, when the beam direction of the directional antenna separately coincides with the directions of the plurality of beams in the beam lookup table, signal quality received by the directional antenna from the first target device, to obtain a plurality of pieces of signal quality further includes:

driving, by using the driving apparatus, the directional antenna to rotate around the second axis, so that the beam direction of the directional antenna separately coincides with directions of a plurality of beams in the target beam subset, and detecting, when the beam direction of the directional antenna separately coincides with the directions of the plurality of beams in the target beam subset, the signal quality received by the directional antenna from the first target device, to obtain a plurality of pieces of fourth signal quality.

The determining the target beam in the beam lookup table based on the plurality of pieces of signal quality includes:

determining the target beam in the target beam subset based on the plurality of pieces of fourth signal quality.

In this way, the plurality of beams in the beam lookup table are distributed within a three-dimensional space range. When the directional antenna rotates until the beam direction separately coincides with directions of a plurality of beams within the three-dimensional space range, the directional antenna can cover the target device within the three-dimensional space range. The wireless router may be applied to building structures such as a villa and a duplex.

In a possible implementation of the second aspect, the determining the target beam in the beam lookup table includes:

acquiring position information of the first target device; and determining the target beam in the beam lookup table based on the position information.

In this way, the wireless router does not need to look up the target beam through polling, and can quickly determine the target beam with a fast response and a short delay time.

In a possible implementation of the second aspect, after the first signal quality is obtained, the control method further includes:

determining whether the first signal quality is greater than or equal to the third preset threshold; and when the first signal quality is greater than or equal to the third preset threshold, covering, by using the omnidirectional antenna, the first target device for operating. When the first signal quality is greater than or equal to the third preset threshold, the first target device may be covered by using the omnidirectional antenna and the directional antenna, the directional antenna may not be used, or the directional antenna is used to cover another target device. Therefore, proper resource configuration can be implemented.

In a possible implementation of the second aspect, the control method further includes:

acquiring the signal quality received by the directional antenna from the first target device, to obtain second signal quality.

The driving, by using the driving apparatus, the directional antenna to rotate, so that a beam direction of the directional antenna coincides with a direction of a target beam in a beam lookup table includes:

driving, by using the driving apparatus when the first signal quality is less than the third preset threshold and the second signal quality is less than a fourth preset threshold, the directional antenna to rotate, so that the beam direction of the directional antenna coincides with the direction of the target beam in the beam lookup table.

In this way, after the omnidirectional antenna and the directional antenna that is in a current beam direction cannot cover the first target device, the beam direction of the directional antenna is switched, so that the first target device can be quickly covered, thereby reducing a delay and power consumption in most use scenarios.

In a possible implementation of the second aspect, the acquiring the signal quality received by the directional antenna from the first target device includes:

when the first signal quality is less than the third preset threshold, acquiring the signal quality received by the directional antenna from the first target device. In this way, the omnidirectional antenna is preferentially considered to be used to cover the first target device. When the omnidirectional antenna cannot cover the first target device, the directional antenna is used to cover the first target device, thereby reducing a delay and power consumption in most use scenarios.

In a possible implementation of the second aspect, after the second signal quality is obtained, the control method further includes:

determining whether the second signal quality is greater than or equal to the fourth preset threshold; and when the second signal quality is greater than or equal to the fourth preset threshold, covering, by using the directional antenna that is in a current beam direction, the first target device for operating. In this way, the first target device is covered by using the directional antenna that is in the current beam direction. The first target device is covered without rotating the directional antenna. Therefore, the delay and the power consumption are low.

In a possible implementation of the second aspect, after the beam direction of the directional antenna coincides with the direction of the target beam in the beam lookup table, the control method further includes:

covering, by using the directional antenna with a switched beam direction, the first target device for operating.

In a possible implementation of the second aspect, after the covering, by using the directional antenna with a switched beam direction, the first target device for operating for a preset time, the control method further includes:

acquiring the signal quality received by the directional antenna from the first target device, to obtain the second signal quality;

determining whether the second signal quality is greater than or equal to a fifth preset threshold; and when the second signal quality is greater than or equal to the fifth preset threshold, reacquiring the signal quality received by the omnidirectional antenna from the first target device.

In this way, whether the omnidirectional antenna can cover the first target device can be redetermined when the signal quality is improved, to implement proper resource configuration.

In a possible implementation of the second aspect, after the second signal quality is obtained, the control method further includes:

determining whether the second signal quality is less than or equal to a sixth preset threshold, where the sixth preset threshold is less than the fifth preset threshold; and when the second signal quality is less than or equal to the sixth preset threshold, reacquiring the signal quality received by the omnidirectional antenna from the first target device. In this way, when the signal quality deteriorates, an optimal antenna can be searched for again for coverage.

In a possible implementation of the second aspect, the control method further includes: when the second signal quality is less than the fifth preset threshold and the second signal quality is greater than the sixth preset threshold, still covering, by using the directional antenna with the switched beam direction, the first target device for operating.

In a possible implementation of the second aspect, the control method further includes:

determining priorities of a plurality of target devices based on device information of the plurality of target devices, where the device information includes at least one of a network type, a device type, a wireless data request characteristic, or device use information, and the device use information includes at least one of a use time or a use probability; and determining a target device with a highest priority in the plurality of target devices as the first target device.

In this way, rationality of beam switching can be improved.

According to a third aspect, some embodiments of this application provide a computer storage medium. The computer storage medium includes computer instructions. When the computer instructions are run on a wireless router, the wireless router is enabled to perform the control method described in any of the foregoing technical solutions.

According to a fourth aspect, some embodiments of this application further provide a computer program product. When the computer program product runs on a computer, the computer is enabled to perform the control method described in any of the foregoing technical solutions.

The computer storage medium or the computer program product provided in the embodiments of this application is configured to perform the control method described in any of the foregoing technical solutions. Therefore, for beneficial effects that can be achieved by the computer storage medium or the computer program product, refer to the beneficial effects of the corresponding control method described above. Details are not described herein again.

DESCRIPTION OF EMBODIMENTS

Figure 1:
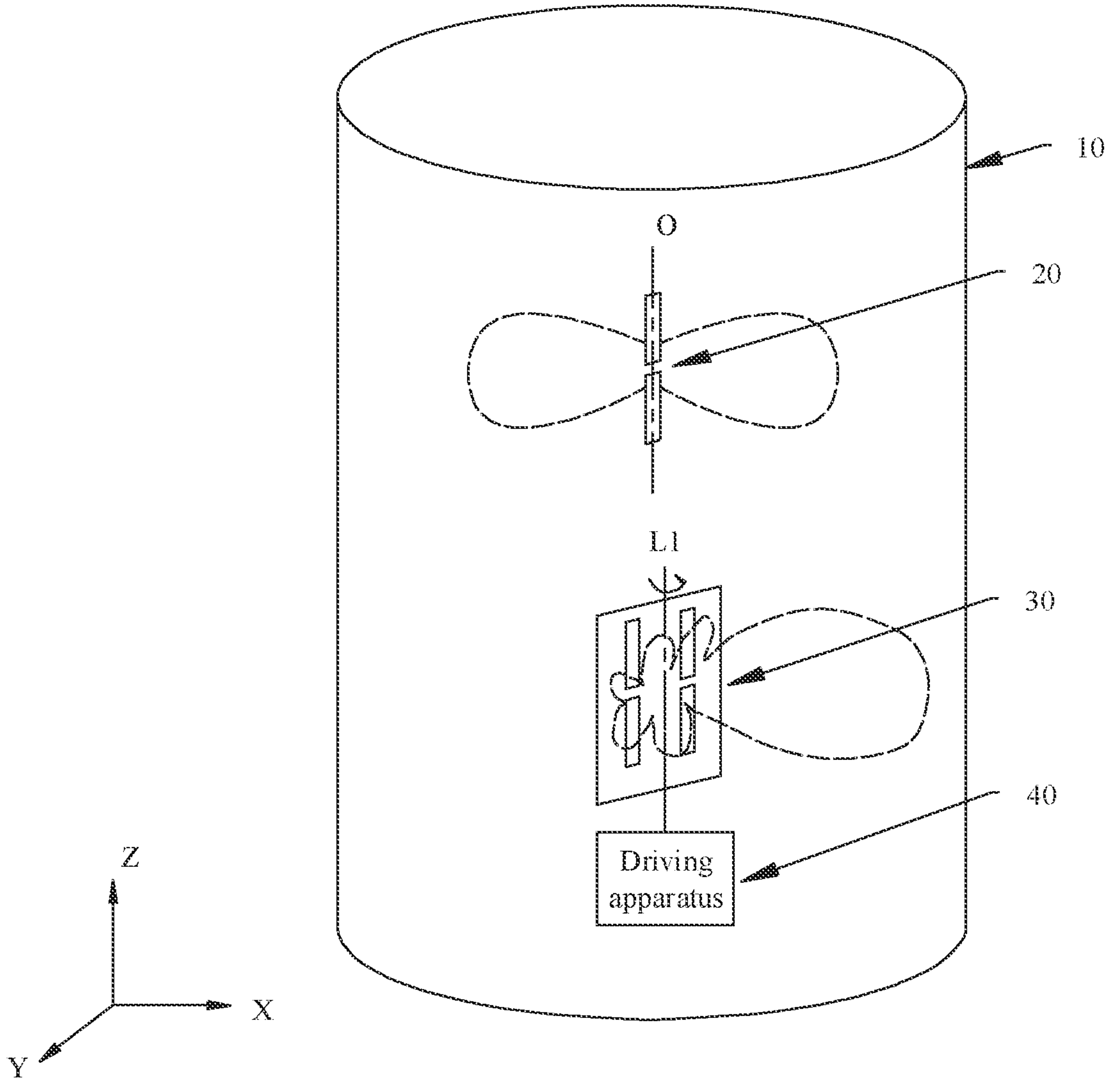
FIG. 1 is a schematic diagram of a structure of a home wireless router according to some embodiments of this application.

In the embodiments of this application, terms "first", "second", "third", and "fourth" are used for descriptive purposes only, and cannot be construed as indicating or implying relative importance or implicitly indicating a quantity of indicated technical features. Therefore, features defined with "first", "second", "third" and "fourth" may explicitly or implicitly include one or more of the features.

In the embodiments of this application, the term "include". "comprise", or any other variant thereof is intended to cover non-exclusive inclusion, so that a process, method, article, or apparatus that includes a series of elements includes not only those elements but also other elements that are not explicitly listed, or includes elements inherent to such a process, method, article, or apparatus. Without further limitation, the element defined by the sentence "including a . . . " does not exclude that other identical elements also exist in the process, method, article, or apparatus including the element.

In the embodiments of this application, the term "and/or" is only used to describe an association relationship between associated objects, and indicates that three relationships may exist. For example, A and/or B may indicate that only A exists, both A and B exist, and only B exists. In addition, the symbol "/" in this specification usually indicates an "or" relationship between the associated objects.

It should be noted that, in the embodiments of this application, all orientation relationship qualifiers such as "coincide", "parallel", and "perpendicular" that are used to describe a beam direction of each component or antenna in a wireless router indicate an approximate orientation that allows a specific error, and are not limited to an absolute orientation relationship.

Embodiments of this application provide a wireless router to improve application universality of the wireless router. On a basis of serving common user equipment, the wireless router can further serve a medium/long-distance weak field device and a high-speed device. Specifically, in the embodiments of this application, in addition to a built-in omnidirectional antenna, a directional antenna with an adjustable beam direction is additionally disposed in the wireless router. The directional antenna has a higher antenna gain (8 dBi~12 dBi). In this way, on a basis of meeting access of a common device by using the omnidirectional antenna, access of a medium/long-distance weak field device and a high-speed device is met by using the directional antenna that has a high gain and the adjustable beam direction. In this way, application universality of the wireless router is improved.

The following describes the embodiments of this application in detail with reference to the accompanying drawings. In addition, before the embodiments of this application are described in detail, an application scenario of a wireless coverage system provided in this application is first described.

This application provides a wireless router. The wireless router may be an outdoor wireless router, or may be an indoor home wireless router. The following embodiments are described by using a home wireless router as an example. This cannot be considered as a special limitation on this application. In addition, the wireless router provided in this application may support WiFi-2.4G, WiFi-5G, WiFi-6E, and at least one of the foregoing universal frequency bands. This is not specifically limited in this application.

FIG. 1 is a schematic diagram of a structure of a home wireless router 100 according to some embodiments of this application. It should be noted that, for ease of description of the following embodiments, an XYZ coordinate system is established for the home wireless router 100 shown in FIG. 1. Specifically, a height direction of the wireless router 100 in home use is defined as a Z-axis direction, and a plane perpendicular to the Z-axis direction is an XY plane. It may be understood that the coordinate system of the wireless router 100 may be flexibly set based on an actual requirement. This is not specifically limited herein.

The wireless router 100 includes a housing 10. The housing 10 is configured to implement water-proof and dust-proof protection for an internal electronic device. A material of the housing 10 includes but is not limited to plastic. A shape of the housing 10 includes but is not limited to a cylindrical shape, a square cylindrical shape, a disk shape, a triangular prism, and a spherical shape. FIG. 1 shows an example in which the housing 10 is in a cylindrical shape. This cannot be considered as a special limitation on the shape of the housing 10. In some other embodiments, the housing 10 may not be disposed on the wireless router 100.

Still refer to FIG. 1. The wireless router 100 further includes an omnidirectional antenna 20 and a directional antenna 30. The omnidirectional antenna 20 and the directional antenna 30 are configured to implement wireless coverage of the wireless router. Specifically, the omnidirectional antenna 20 and the directional antenna 30 are configured to support transmission and reception of a signal of WiFi-2.4G, WiFi-5G, WiFi-6E, or at least one of the foregoing universal frequency bands. In some embodiments, the omnidirectional antenna 20 and the directional antenna 30 may be disposed in the housing 10, to prevent the omnidirectional antenna and the directional antenna 30 from being interfered by an external environment. In some other embodiments, the omnidirectional antenna 20 and the directional antenna 30 may be partially disposed inside the housing 10 and partially disposed outside the housing 10, or may be completely disposed outside the housing 10. This is not specifically limited in this embodiment of this application.

Figure 2:
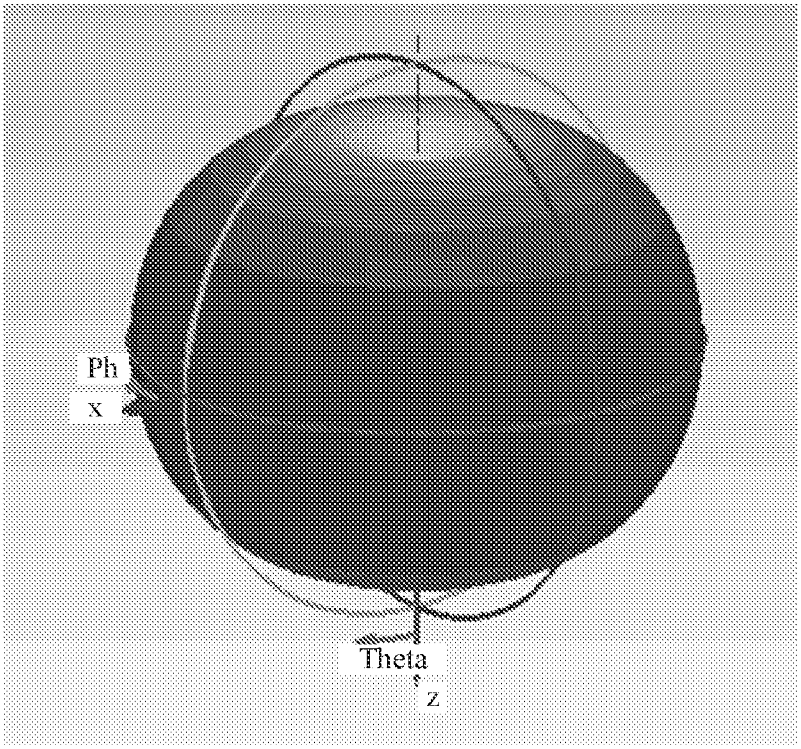
FIG. 2 is an antenna pattern of an omnidirectional antenna in the wireless router shown in FIG. 1 in three-dimensional space.

In some embodiments, the omnidirectional antenna 20 is fastened to the housing 10. The omnidirectional antenna 20 has a central axis O, and the central axis O coincides with a central axis of an antenna pattern of the omnidirectional antenna 20 in three-dimensional space. FIG. 2 is an antenna pattern of the omnidirectional antenna 20 in the wireless router 100 shown in FIG. 1 in the three-dimensional space. The antenna pattern of the omnidirectional antenna 20 is approximately in an "apple" shape, and the central axis O coincides with a central axis of the apple-shaped antenna pattern. In some embodiments, the central axis O extends in the Z-axis direction. In this way, the omnidirectional antenna 20 shows homogeneous radiation of 360° in the XY plane. When the wireless router 100 is applied to a home, the omnidirectional antenna 20 can implement short-distance coverage within a 360° range in the XY plane.

Figure 3:
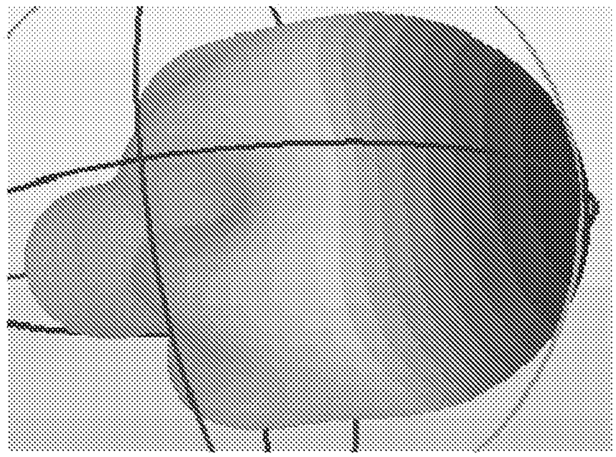
FIG. 3 is an antenna pattern of a directional antenna in the wireless router shown in FIG. 1 in three-dimensional space.
Figure 4:
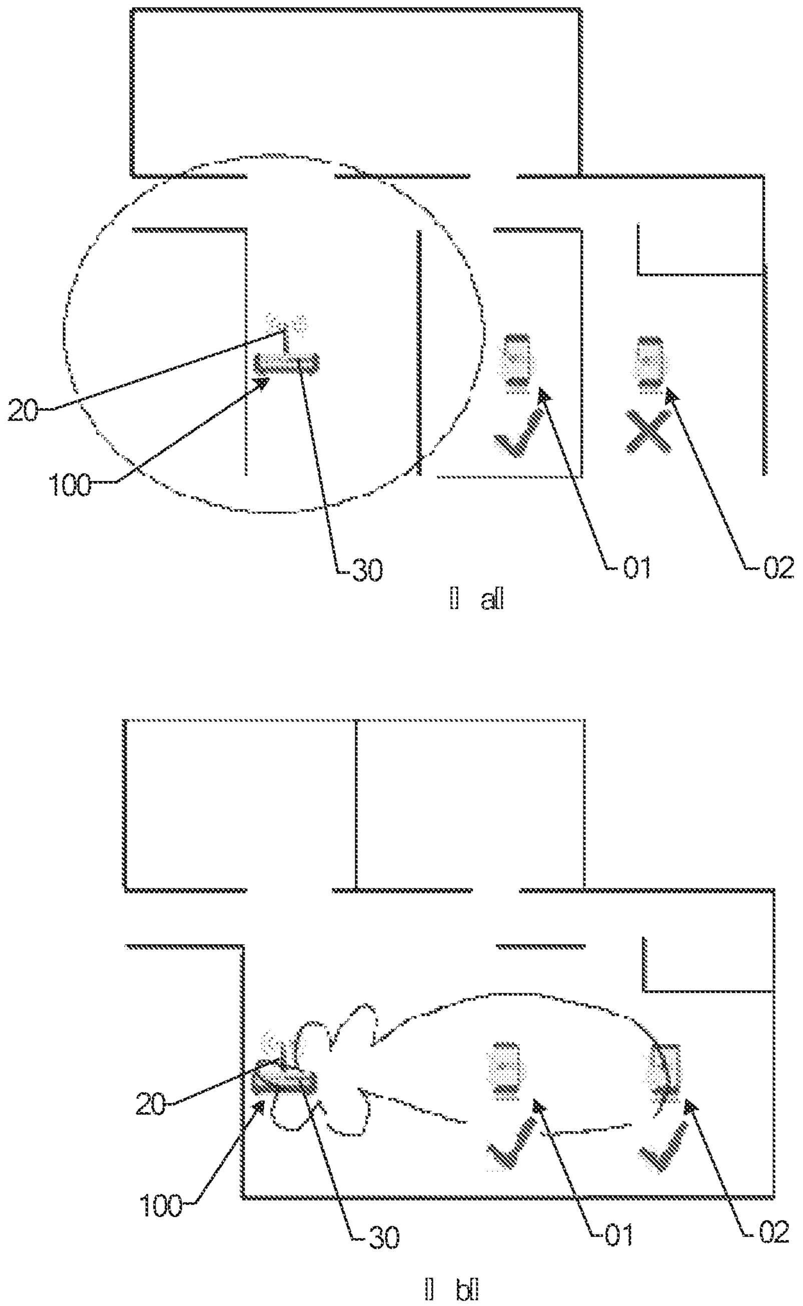
FIG. 4 is a schematic diagram of coverage areas of an omnidirectional antenna and a directional antenna when the wireless router shown in FIG. 1 is applied to a large flat house building, where A of FIG. 4 is a schematic diagram of the coverage area of the omnidirectional antenna, and B of FIG. 4 is a schematic diagram of the coverage area of the directional antenna.

FIG. 3 is an antenna pattern of the directional antenna 30 in the wireless router 100 shown in FIG. 1 in the three-dimensional space. It can be seen from FIG. 3 that a signal transmission and reception capability of the directional antenna 30 is particularly strong in a specific direction, and the signal transmission and reception capability of the directional antenna 30 in another direction is weak or zero. A direction in which the signal transmission and reception capability of the directional antenna 30 is the strongest is hereinafter referred to as a beam direction of the directional antenna 30. The directional antenna 30 has a large gain (8 dBi~12 dBi), and has a good anti-interference capability. In addition, the directional antenna 30 has a longer coverage distance compared with the omnidirectional antenna 20. For example, FIG. 4 is a schematic diagram of coverage areas of the omnidirectional antenna 20 and the directional antenna 30 when the wireless router 100 shown in FIG. 1 is applied to a large flat house building. Specifically, A of FIG. 4 is a schematic diagram of the coverage area of the omnidirectional antenna 20, and B of FIG. 4 is a schematic diagram of the coverage area of the directional antenna 30. In this example, the omnidirectional antenna 20 has a short coverage distance, and can cover only a target decvice 01 that is relatively close, and cannot cover a target device 02 that is relatively far. The directional antenna 30 has a long coverage distance, and can cover both of the target device 01 that is relatively close and the target device 02 that is relatively far. It can be learned that, compared with the omnidirectional antenna 20, the directional antenna 30 has a longer coverage distance and can cover a medium/long-distance target device.

It should be noted that the target device in this embodiment of this application is an electronic device that needs to establish a connection to the wireless router 100 to achieve an Internet access objective. Specifically, the target device includes but is not limited to a personal computer, a wireless router, a portable computer device, a mobile terminal device (for example, a PDA, a palmtop computer device, a mobile phone, or a smartphone), a smart wearable device, or a smart home device (for example, a smart television, a smart refrigerator, an air conditioner, a washing machine, or an air purifier). The smart wearable device includes but is not limited to a bracelet, a watch, augmented reality (augmented reality. AR) glasses, an AR helmet, virtual reality (virtual reality, VR) glasses, or a VR helmet.

It can be learned from comparison between FIG. 2 and FIG. 3 that, compared with the omnidirectional antenna 20, beams of the directional antenna 30 are concentrated in one or more directions. Therefore, a coverage angle of the directional antenna 30 is narrow. Refer back to FIG. 1. Based on this, to enable the omnidirectional antenna 20 to serve target devices at different positions, the wireless router further includes a driving apparatus 40. The driving apparatus 40 is configured to drive the directional antenna 30 to rotate, to adjust the beam direction of the directional antenna 30, so that the directional antenna 30 can serve the target devices at different positions.

Still refer to FIG. 1. In some embodiments, the driving apparatus 40 is configured to drive the directional antenna 30 to rotate around a first axis L1. Optionally, the first axis L1 is parallel to the central axis O of the omnidirectional antenna 20. In some other optional embodiments, the first axis L1 may alternatively be perpendicular to or intersect with the central axis O of the omnidirectional antenna 20. The following embodiments are described on a basis that the first axis L1 is parallel to the central axis O of the omnidirectional antenna 20. This cannot be considered as a special limitation on this application. Because the central axis O of the omnidirectional antenna 20 extends in the height direction of the wireless router 100 (namely, the Z-axis direction), the first axis L1 also extends in the height direction of the wireless router 100. In this way, the driving apparatus 40 can adjust the beam direction of the directional antenna 30 in the XY plane, so that the directional antenna 30 can serve target devices at different positions in the XY plane. Therefore, the wireless router 100 can be applicable to a large flat house building structure.

Figure 5:
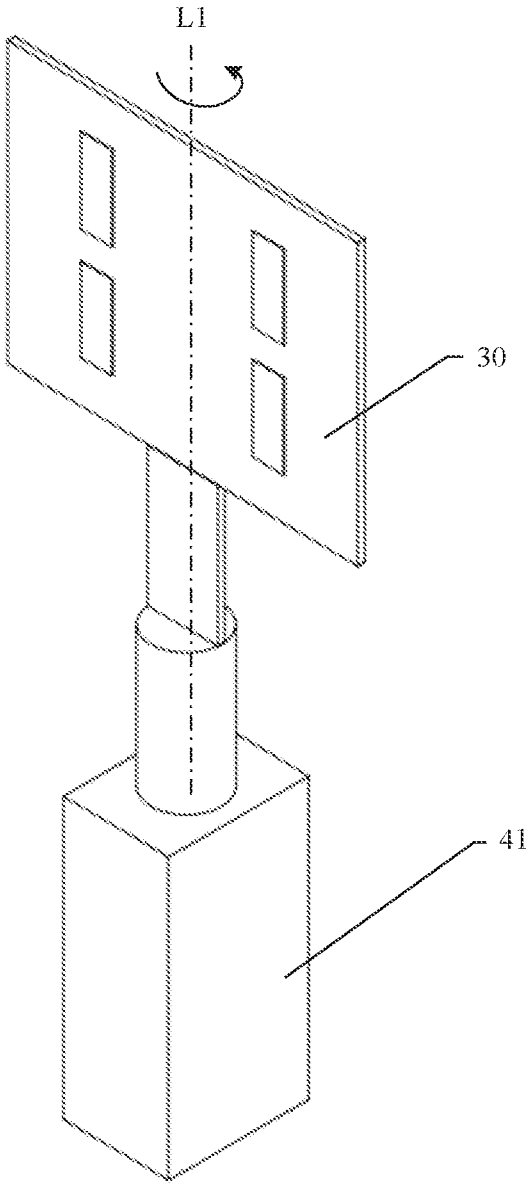
FIG. 5 is a schematic diagram of a structure of a driving apparatus in the wireless router shown in FIG. 1.

The driving apparatus 40 has a plurality of structural forms. For example, FIG. 5 is a schematic diagram of a structure of a driving apparatus 40 in the wireless router 100 shown in FIG. 1. In this example, the driving apparatus 40 includes a rotary motor 41. The rotary motor 41 may be a motor with a decelerator, or may be a motor without a decelerator. A type of the rotary motor 41 includes but is not limited to a servo motor, a stepper motor, a torque motor, a switched reluctance motor, and a brushless direct current motor. A central axis of an output shaft of the rotary motor 41 is collinear with the first axis L1, and the output shaft of the rotary motor 41 is fixedly connected to the directional antenna 30.

In this way, when the rotary motor 41 rotates, the directional antenna 30 can be driven to rotate around the first axis LL. The driving apparatus 40 has a simple structure and low costs, and the rotary motor 41 is directly connected to the directional antenna 30 without a transmission apparatus. Therefore, transmission efficiency is high and a mechanical energy loss is low.

Figure 6:
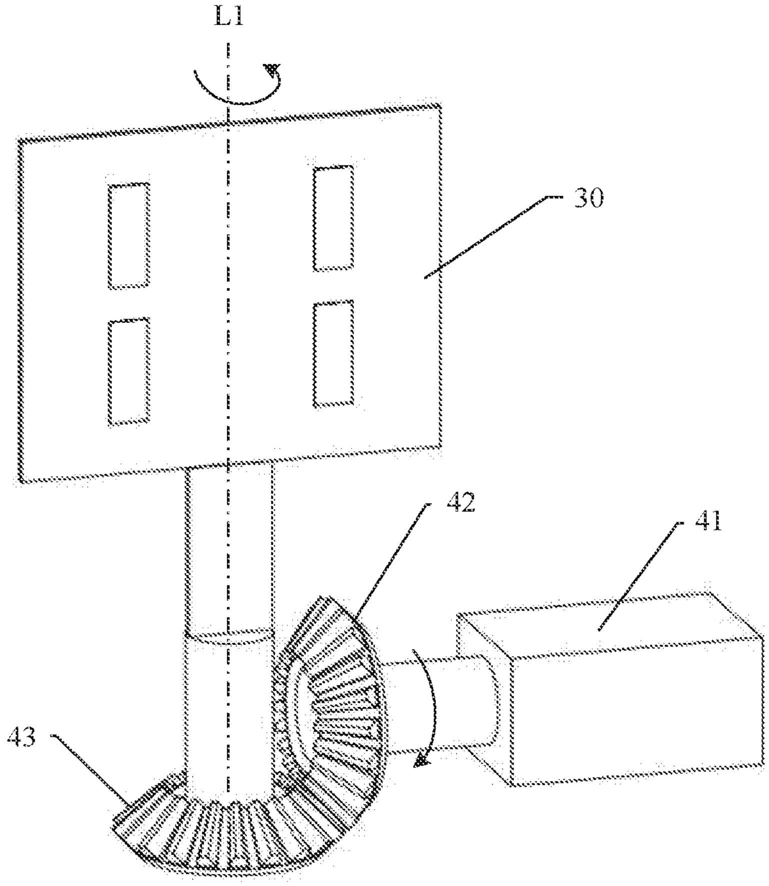
FIG. 6 is a schematic diagram of a structure of still another driving apparatus in the wireless router shown in FIG. 1.

For another example, FIG. 6 is a schematic diagram of a structure of still another driving apparatus 40 in the wireless router 100 shown in FIG. 1. In this example, the driving apparatus 40 includes a rotary motor 41, a driving bevel gear 42, and a driven bevel gear 43. The rotary motor 41 may be a motor with a decelerator, or may be a motor without a decelerator. A type of the rotary motor 41 includes but is not limited to a servo motor, a stepper motor, a torque motor, a switched reluctance motor, and a brushless direct current motor. An output shaft of the rotary motor 41 is connected to the driving bevel gear 42, to drive the driving bevel gear 42 to rotate. The driven bevel gear 43 is meshed with the driving bevel gear 42 for transmission, a central axis of the driven bevel gear 43 is collinear with the first axis L1, and the driven bevel gear 43 is fixedly connected to the directional antenna 30.

In this way, when the rotary motor 41 rotates, the driving bevel gear 42 is meshed with the driven bevel gear 43 for transmission, and the directional antenna 30 can be driven to rotate around the first axis L1. Gear transmission has high precision, high transmission efficiency, and a low loss. In addition, a transmission path is transited through bevel gear transmission, so that the rotary motor 41 can be mounted on one side of the first axis L1, thereby reducing an occupancy height of the driving apparatus 40 in the Z-axis direction.

Figure 7:
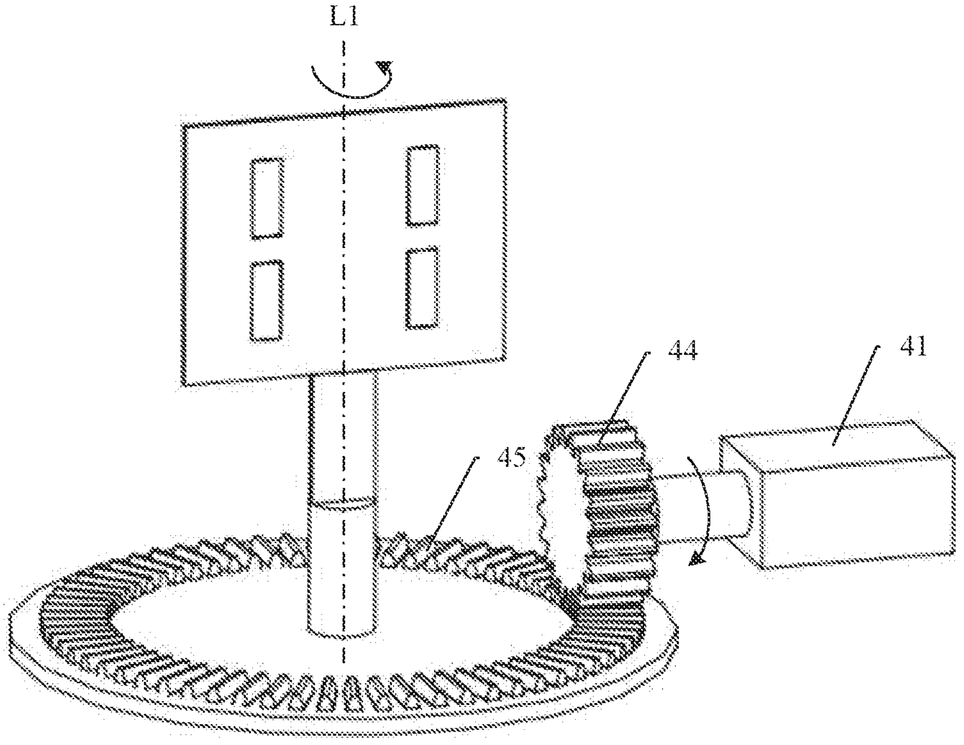
FIG. 7 is a schematic diagram of a structure of still another driving apparatus in the wireless router shown in FIG. 1.

For another example, FIG. 7 is a schematic diagram of a structure of still another driving apparatus 40 in the wireless router shown in FIG. 1. In this example, the driving apparatus 40 includes a rotary motor 41, a driving gear 44, and a contrate gear 45. The rotary motor 41 may be a motor with a decelerator, or may be a motor without a decelerator. A type of the rotary motor 41 includes but is not limited to a servo motor, a stepper motor, a torque motor, a switched reluctance motor, and a brushless direct current motor. An output shaft of the rotary motor 41 is connected to the driving gear 44, to drive the driving gear 44 to rotate. The driving gear 44 is meshed with the contrate gear 45 for transmission, a central axis of the contrate gear 45 is collinear with the first axis L1, and the contrate gear 45 is fixedly connected to the directional antenna 30.

In this way, when the rotary motor 41 rotates, the driving gear 44 is meshed with the contrate gear 45 for transmission, and the directional antenna 30 can be driven to rotate around the first axis L1. Gear transmission has high precision, high transmission efficiency, and a low loss. In addition, a transmission path is transited through transmission of the driving gear and the contrate gear, so that the rotary motor 41 can be mounted on one side of the first axis L1, to reduce an occupancy height of the driving apparatus 40 in the Z-axis direction, and a radius of the contrate gear is large, which lengthens a distance between the rotary motor 41 and the directional antenna 30, so that the rotary motor 41 can be mounted at an area with a spacious space in the wireless router.

It should be noted that, in addition to the rotary motor or a combination of the rotary motor and a gear transmission apparatus, the driving apparatus 40 may alternatively include a combination of the rotary motor and a transmission apparatus other than the gear transmission apparatus, for example, a belt transmission apparatus, a pneumatic transmission apparatus, or a hydraulic transmission apparatus. This is not specifically limited in this application.

Figure 8:
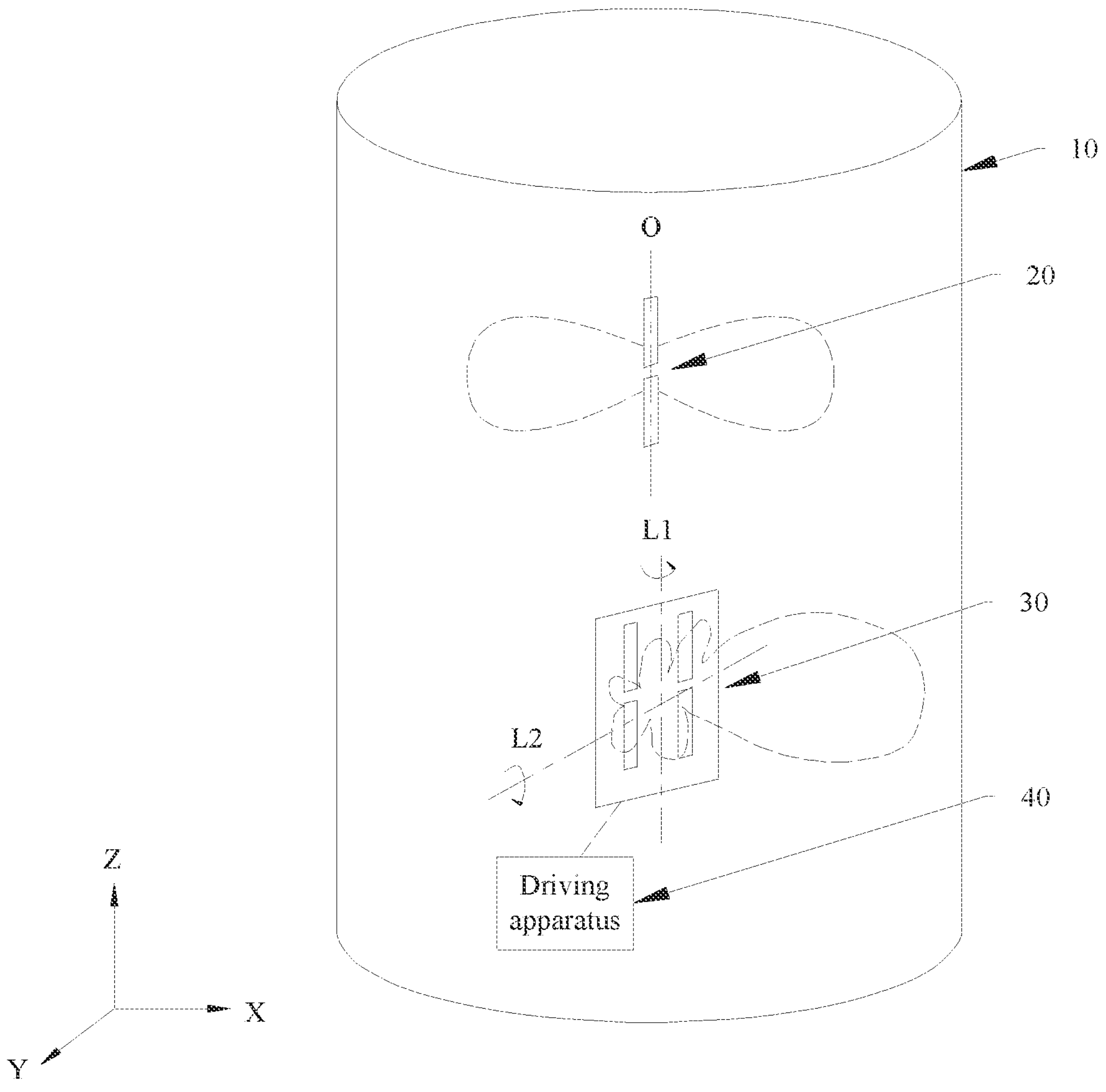
FIG. 8 is a schematic diagram of a structure of a wireless router according to some other embodiments of this application.

In some embodiments, FIG. 8 is a schematic diagram of a structure of a wireless router 100 according to some other embodiments of this application. A difference between the wireless router shown in FIG. 8 and the wireless router shown in FIG. 1 lies in: In the wireless router shown in FIG. 8, in addition to being configured to drive the directional antenna 30 to rotate around the first axis L1, the driving apparatus 40 is further configured to drive the directional antenna 30 to rotate around a second axis L2, where the second axis L2 is perpendicular to the first axis L1, and the second axis L2 is further perpendicular to the beam direction of the directional antenna 30. The beam direction of the directional antenna 30 changes when the directional antenna 30 rotates around the first axis L1. Therefore, an extension direction of the second axis L2 also changes with a change of the beam direction of the directional antenna 30. In this way, the driving apparatus 40 can adjust the beam direction of the directional antenna 30 within an XYZ three-dimensional space range, so that the directional antenna 30 can serve target devices at different positions within the XYZ three-dimensional space range. Therefore, the wireless router 100 can be applicable to building structures such as a villa and a duplex.

In the foregoing embodiment, the driving apparatus 40 has a plurality of structural forms. For example, the driving apparatus 40 may be of a spherical hinge structure that is movable in any direction in XYZ three-dimensional space.

Figure 9:
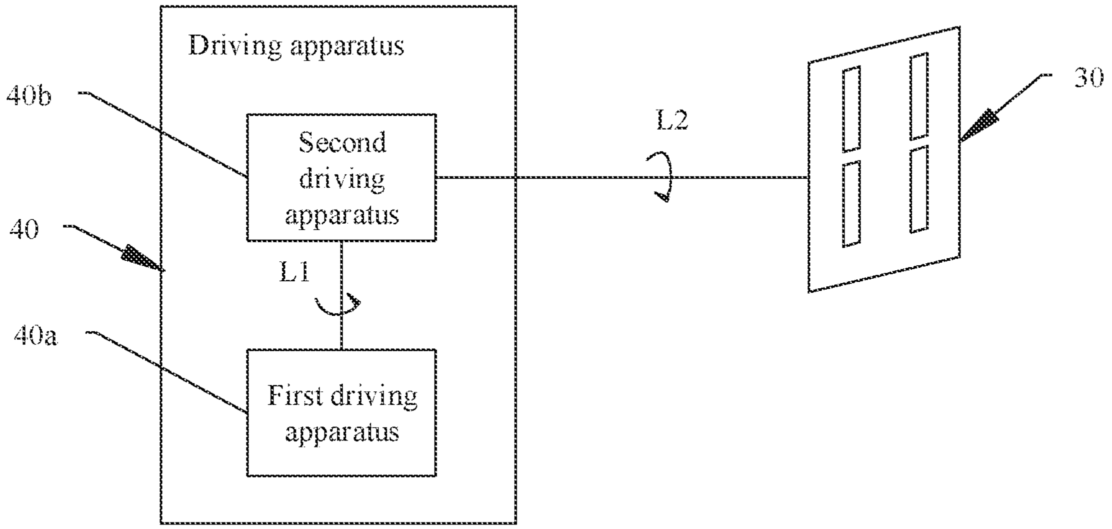
FIG. 9 is a schematic diagram of a structure of a driving apparatus in the wireless router shown in FIG. 8.

For another example, FIG. 9 is a schematic diagram of a structure of a driving apparatus 40 in the wireless router 100 shown in FIG. 8. In this example, the driving apparatus 40 includes a first driving apparatus 40*a* and a second driving apparatus 40*b*. The first driving apparatus 40*a* is configured to drive the directional antenna 30 to rotate around the first axis L1. A structural form of the first driving apparatus 40*a* may be the same as the structural form of the driving apparatus 40 in the wireless router 100 shown in FIG. 1. Details are not described herein again. The second driving apparatus 40*b* is connected between the first driving apparatus 40*a* and the directional antenna 30. When driving the directional antenna 30 to rotate around the first axis L1, the first driving apparatus 40*a* is further configured to drive the second driving apparatus 40*b* to rotate together with the directional antenna 30 around the first axis L1. The second driving apparatus 40*b* is configured to drive the directional antenna 30 to rotate around the second axis L2. In this way, the first driving apparatus 40*a* and the second driving apparatus 40*b* are used to separately drive the directional antenna 30 to rotate around the first axis L1 and the second axis L2, so that difficulty and costs of structure manufacturing of the driving apparatuses can be reduced. In addition, driving processes of the two driving apparatuses are independent of each other, thereby ensuring driving precision.

In the foregoing embodiment, a structural form of the second driving apparatus 40*b* includes but is not limited to a rotary motor or a combination of a rotary motor and a transmission apparatus, for example, a belt transmission apparatus, a pneumatic transmission apparatus, a hydraulic transmission apparatus, or a gear transmission apparatus.

Figure 10:
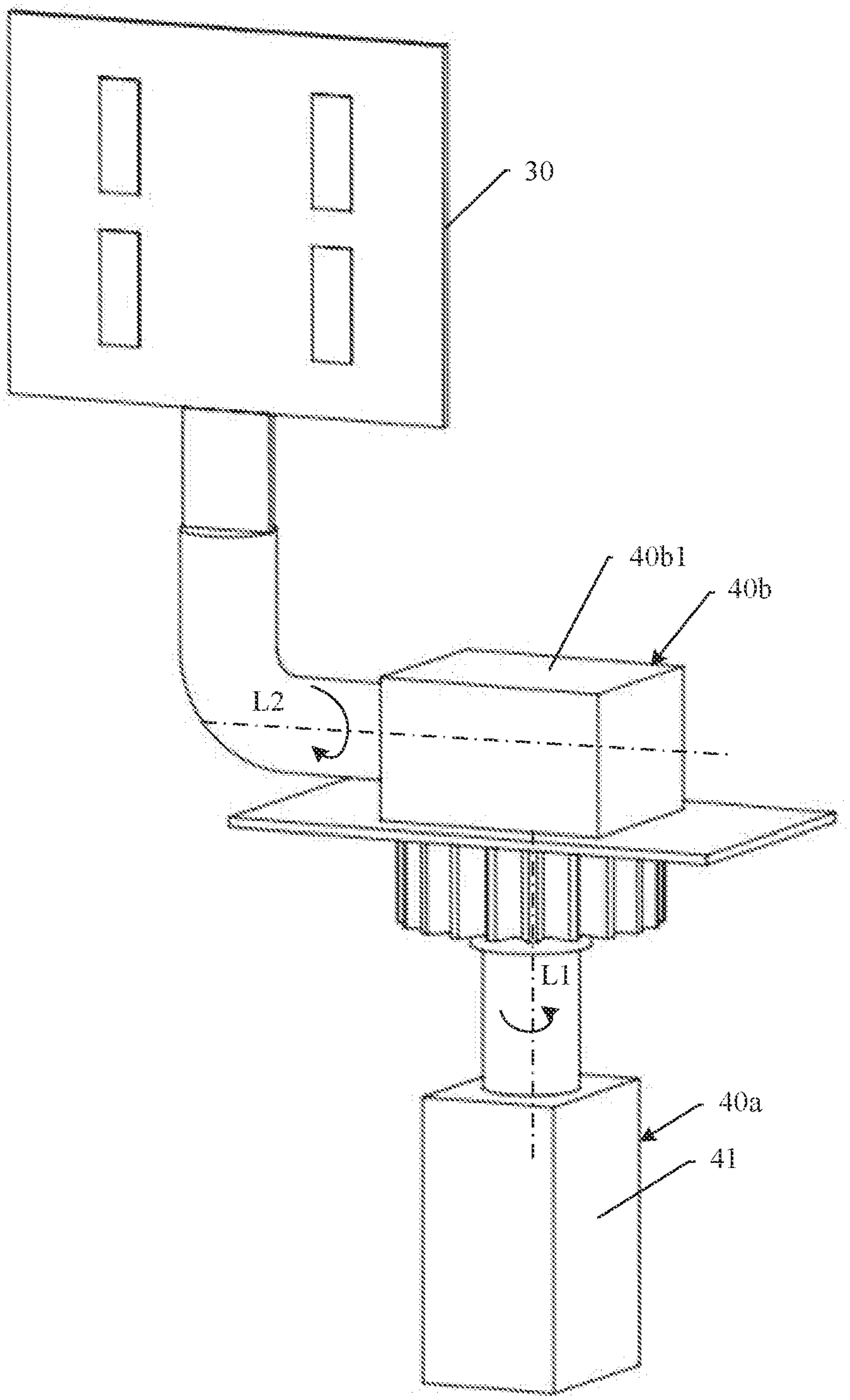
FIG. 10 is a schematic diagram of a specific structure of the driving apparatus shown in FIG. 9.

For example, FIG. 10 is a schematic diagram of a specific structure of the driving apparatus 40 shown in FIG. 9. In this embodiment, a structural form of the first driving apparatus 40*a* is the same as that of the driving apparatus 40 shown in FIG. 5. Details are not described herein again. The second driving apparatus 40*b* includes a rotary motor 40*b*1, a stator part of the rotary motor 40*b*1 is fastened relative to an output shaft of a rotary motor of the first driving apparatus 40*a*, and the first driving apparatus 40*a* is configured to drive the rotary motor 40*b*1 to rotate around the first axis L1. Based on this, the directional antenna 30 is fastened to a rotor part of the rotary motor 40*b*1, and the rotary motor 40*b*1 is configured to drive the directional antenna 30 to rotate around the second axis L2. The second driving apparatus 40*b* has a simple structure, high transmission efficiency, and a low mechanical energy loss.

Figure 11:
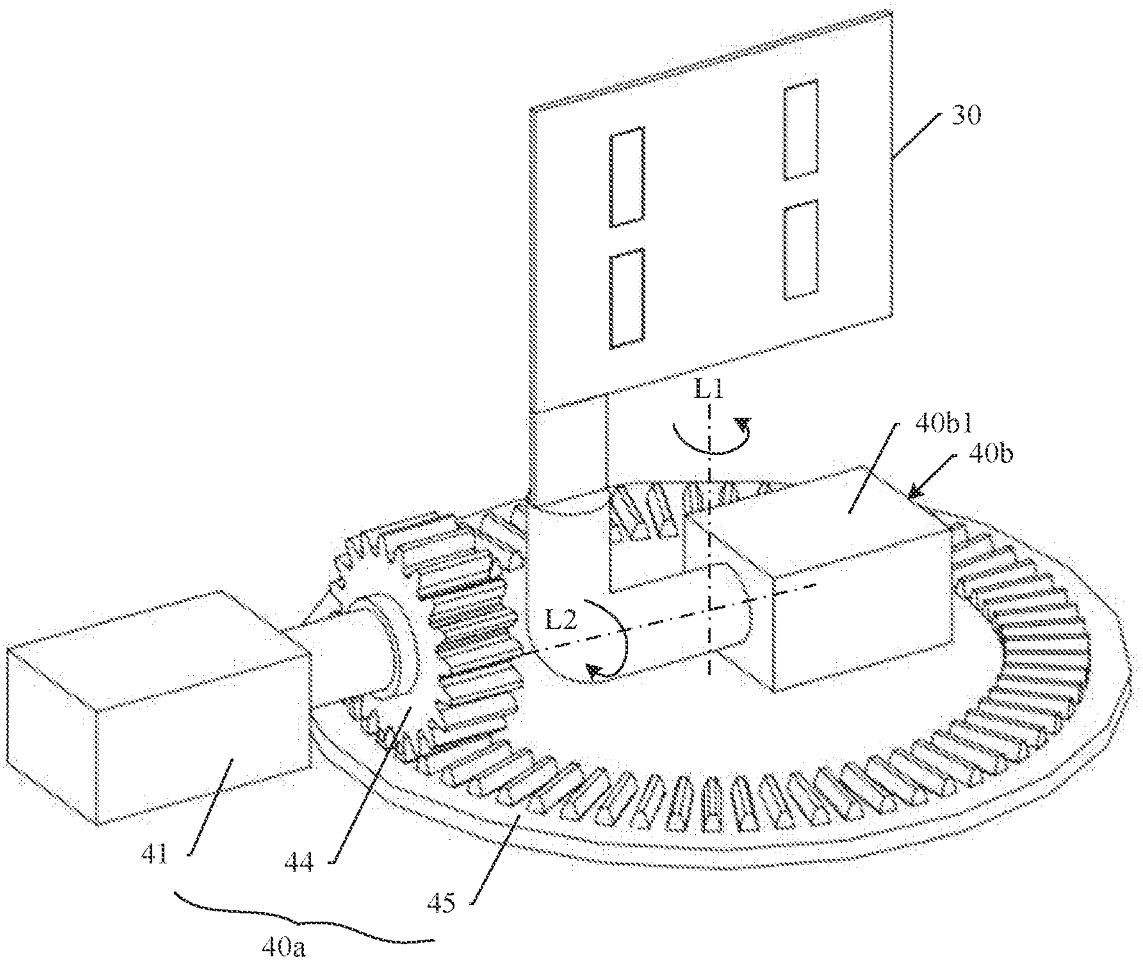
FIG. 11 is a schematic diagram of still another specific structure of the driving apparatus shown in FIG. 9.

For another example, FIG. 11 is a schematic diagram of still another specific structure of the driving apparatus 40 shown in FIG. 9. In this embodiment, a structural form of the first driving apparatus 40*a* is the same as that of the driving apparatus 40 shown in FIG. 7. Details are not described herein again. The second driving apparatus 40*b* also includes a rotary motor 40*b*1, a stator part of the rotary motor 40*b*1 is fastened relative to a contrate gear in the first driving apparatus 40*a*, and the first driving apparatus 40*a* is configured to drive the rotary motor 40*b*1 to rotate around the first axis L1. Based on this, the directional antenna 30 is fastened to a rotor part of the rotary motor 40*b*1, and the rotary motor 40*b*1 is configured to drive the directional antenna 30 to rotate around the second axis L2. The second driving apparatus 40*b* has a simple structure, high transmission efficiency, and a low mechanical energy loss.

The foregoing embodiments separately describe the plurality of structural forms of the driving apparatus 40. Certainly, the driving apparatus 40 may alternatively have another structural form, provided that the directional antenna 30 can be driven to rotate to adjust the beam direction of the directional antenna 30.

In some embodiments, the directional antenna 30 includes a radiator and a reflection panel. When at least one of the radiator and the reflection panel rotates, the beam direction of the directional antenna 30 can be changed. Based on this, the driving apparatus 40 may be connected to the radiator and/or the reflection panel of the directional antenna 30, to drive the radiator and/or the reflection panel of the directional antenna 30 to rotate, thereby changing an aperture direction of the radiator and a reflection direction of the reflection panel to adjust the beam direction of the directional antenna 30.

In this embodiment of this application, a physical mechanical structure (namely, the driving apparatus 40) is used to drive the directional antenna 30 to rotate, to adjust the beam direction of the directional antenna 30. Compared with a conventional circuit adjustment (for example, beamforming) manner, a physical mechanical adjustment manner has high antenna aperture utilization, a wider beam, and a higher maximum gain. In addition, a control method is simple, a structure of a control circuit is simple, and the directional antenna 30 can be enabled to cover more sectors. For example, a directional antenna adjusted by using a transmission circuit usually covers three-four sectors. However, in this embodiment of this application, the directional antenna adjusted by using the physical mechanical structure can cover far more than four sectors based on stepping precision of the driving apparatus 40.

In this embodiment of this application, on a basis of meeting access of a common device by using the omnidirectional antenna 20, access of a medium/long-distance weak field device and a high-speed device can be met by using the directional antenna that has a high gain and an adjustable beam direction. In this way, application universality of the wireless router 100 can be improved.

In a process of adjusting the beam direction of the directional antenna 30 by using the driving apparatus 40, so that the directional antenna 30 can cover the target device, in some embodiments, a beam lookup table may be established to simplify control difficulty. The beam lookup table includes a set formed by beams when the directional antenna 30 rotates to a plurality of different orientations under driving of the driving apparatus 40. In other words, the beam lookup table includes a set formed by a plurality of beams. The plurality of beams are respectively beams acquired when the directional antenna 30 rotates to the plurality of different orientations under driving of the driving apparatus 40. Based on the this, the driving apparatus 40 may drive the directional antenna 30 to rotate based on the beam lookup table, so that the beam direction of the directional antenna 30 coincides with a direction of a target beam in the beam lookup table. The target beam is one of the plurality of beams included in the beam lookup table, and the target beam can cover the target device.

In this way, in a process of using the driving apparatus 40 to drive the directional antenna 30 to rotate, the directional antenna 30 can be adjusted to a position for covering the target device, provided that the beam direction of the directional antenna 30 coincides with the direction of the target beam in a limited quantity of beams in the beam lookup table, and there is no need to traverse all orientations to which the directional antenna 30 can rotate under driving of the driving apparatus 40. Therefore, control difficulty is low, and power consumption and a delay are low.

Figure 12:
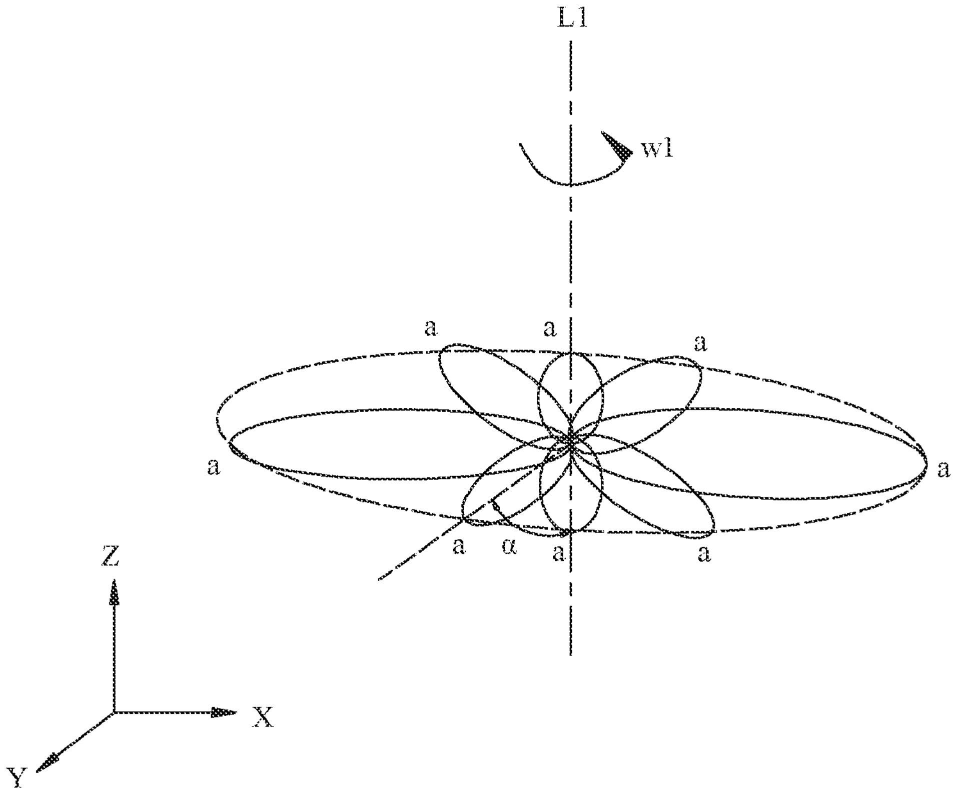
FIG. 12 is a schematic diagram of a structure of a first beam in each of a plurality of beam subsets in a beam lookup table according to some embodiments of this application.

In some embodiments, when the driving apparatus 40 is configured to drive the directional antenna 30 to rotate around the first axis L1, the plurality of beams in the beam lookup table form a plurality of beam subsets arranged in a circumferential direction of the first axis L1, and each beam subset includes at least a first beam a whose direction is perpendicular to the first axis L1. FIG. 12 is a schematic diagram of a structure of the first beam a in each of the plurality of beam subsets in the beam lookup table according to some embodiments of this application. The first beams a of the plurality of beam subsets are respectively beams acquired when the directional antenna 30 rotates around the first axis L1 to the plurality of different orientations under driving of the driving apparatus 40. In this way, when the directional antenna 30 rotates until the beam direction coincides with directions of the plurality of first beams a, the directional antenna 30 can cover the target device in the XY plane. The wireless router may be applied to a large flat building structure.

Still refer to FIG. 12. Based on the foregoing embodiment, to enable the directional antenna 30 to cover the target devices at different positions in the XY plane, in some embodiments, in the circumferential direction w1 of the first axis L1, an included angle $\alpha$ between first beams a in two adjacent beam subsets is greater than or equal to a stepping precision angle used by the driving apparatus 40 to perform driving around the first axis L1, and is less than or equal to a first beam angle of the directional antenna 30.

The included angle α between the first beams a in the two adjacent beam subsets is an included angle between maximum gain directions (namely, beam directions) of the two first beams a.

In addition, the stepping precision angle used by the driving apparatus 40 to perform driving around the first axis L1 is a minimum angle used by the driving apparatus 40 to perform driving around the first axis L1, and the stepping precision angle is greater than 00.

Figure 13:
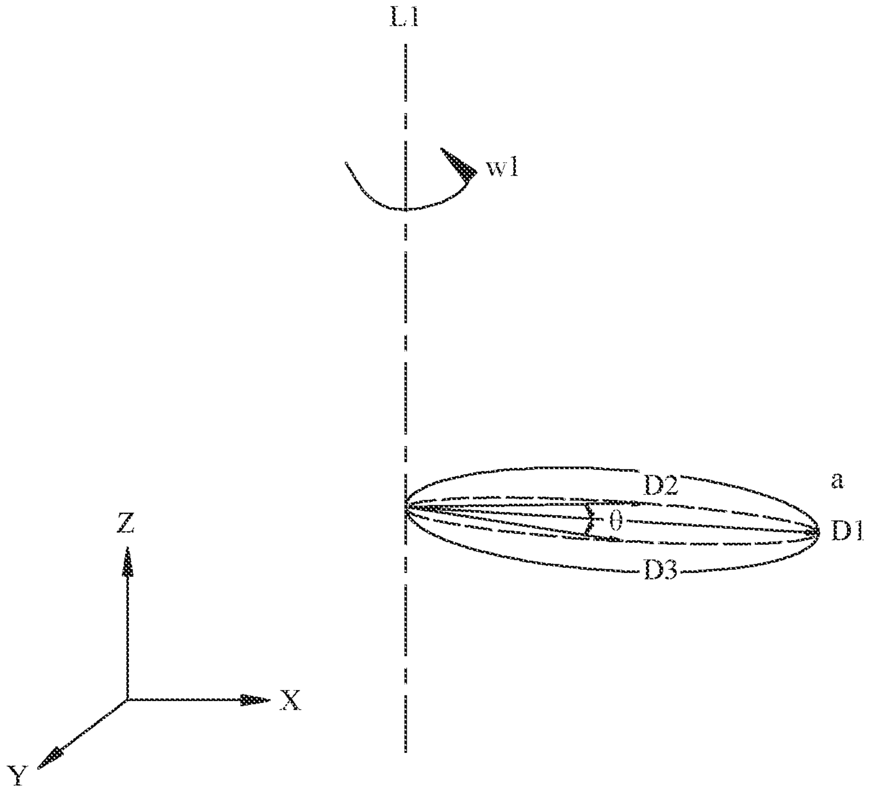
FIG. 13 is a schematic diagram of a first beam angle of a directional antenna in a wireless router according to some embodiments of this application.

In addition, the first beam angle is an included angle between two directions in which radiation powers decrease by a first preset threshold and that are located on two sides of a maximum radiation direction in a plane (namely, the XY plane) perpendicular to the first axis L1 when the beam direction of the directional antenna 30 is perpendicular to the first axis L1. The first preset threshold may be 2 dB, 3 dB, 4 dB, 5 dB, or the like. This is not specifically limited herein. The first preset threshold may be specifically selected based on an actual requirement. For example, FIG. 13 is a schematic diagram of the first beam angle of the directional antenna 30 in the wireless router 100 according to some embodiments of this application. The first beam angle of the directional antenna 30 is an included angle θ between two directions D2 and D3 that are located on two sides of a maximum radiation direction D1 in the XY plane and in which radiation powers decrease by the first preset threshold (for example, 3 dB).

For example, when the included angle α between the first beams a in the two adjacent beam subsets is 20°, there are eighteen beam subsets within a 360° range around the first axis L1. When the included angle α between the first beams a in the two adjacent beam subsets is 45°, there are eight beam subsets within the 360° range around the first axis L1. When the included angle α between the first beams a in the two adjacent beam subsets is 90°, there are four beam subsets within the 360° range around the first axis L1.

In this way, the beam lookup table is complete within the 3600 range in the circumferential direction of the first axis L1, and the beam direction of the directional antenna 30 can be adjusted to a plurality of positions within the 360° range in the circumferential direction of the first axis L1, so that the directional antenna 30 can cover the target device at any position in the XY plane.

Refer back to FIG. 12. In some embodiments, in the circumferential direction w1 of the first axis L1, an included angle α between first beams a in two adjacent beam subsets is equal to a first beam angle of the directional antenna 30. In this way, a quantity of beams in the beam lookup table is small, control difficulty is low, and power consumption and a delay are low.

Based on the foregoing embodiment, when the driving apparatus 40 is configured to drive the directional antenna 30 to rotate around the first axis L1, and is further configured to drive the directional antenna 30 to rotate around the second axis L2, the plurality of beams in the beam lookup table form the plurality of beam subsets arranged in the circumferential direction of the first axis L1, the beam subset includes a plurality of beams arranged in a circumferential direction of the second axis L2, and the first beam a is one of the plurality of beams.

The second axis L2 is perpendicular to the beam direction of the directional antenna 30, and the beam direction of the directional antenna 30 changes when the directional antenna 30 rotates around the first axis L1. Therefore, an extension direction of the second axis L2 also changes with a change of the beam direction of the directional antenna 30. In this way, a plurality of beams in different beam subsets are arranged in different extension directions and in the circumferential direction of the second axis.

Figure 14:
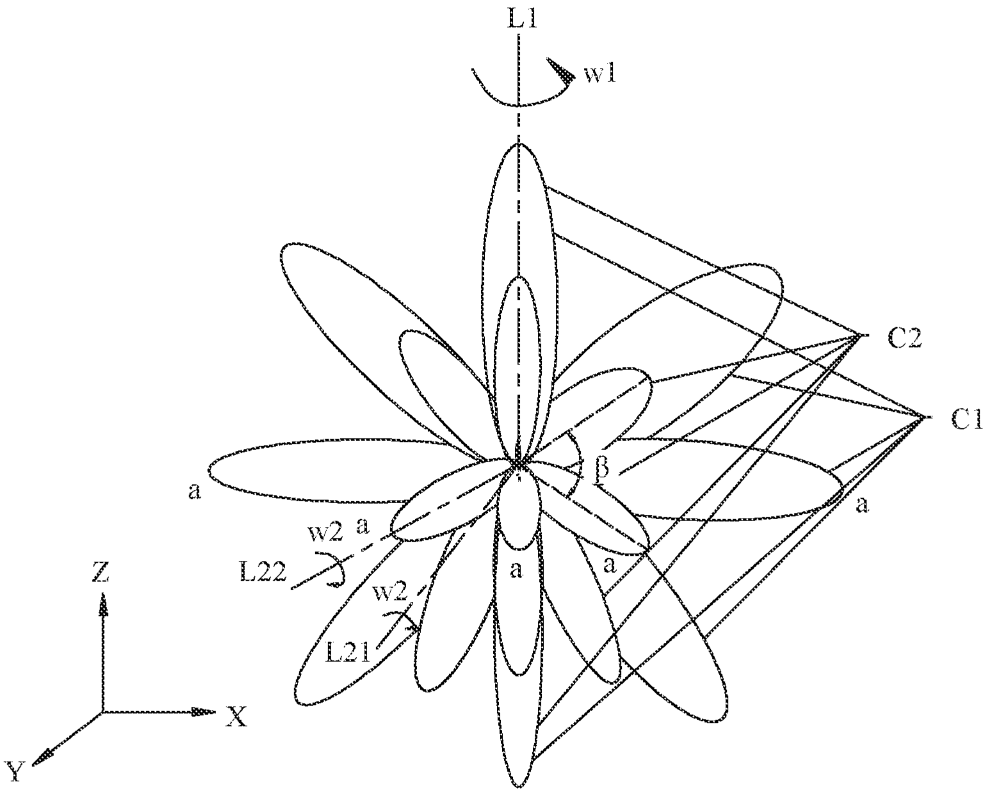
FIG. 14 is a schematic diagram of a structure of a beam lookup table according to some other embodiments of this application.

For example, FIG. 14 is a schematic diagram of a structure of a beam lookup table according to some other embodiments of this application. The beam lookup table includes a plurality of beam subsets arranged in the circumferential direction of the first axis L1. The plurality of beam subsets include a beam subset C1 and a beam subset C2. The beam subset C1 and the beam subset C2 each include a first beam a whose direction is perpendicular to the first axis L1. When the directional antenna 30 is driven by the driving apparatus 40 to rotate, so that the beam direction of the directional antenna 30 separately coincides with a direction of the first beam a in the beam subset C1 and a direction of the first beam a in the beam subset C2, the second axes L2 are respectively an axis L21 and an axis L22, and extension directions of the axis L21 and the axis L22 are different. Based on this, a plurality of beams in the beam subset C1 are arranged in a circumferential direction of the axis L21, and a plurality of beams in the beam subset C2 are arranged in a circumferential direction of the axis L22. In other words, the plurality of beams in the beam subset C1 and the plurality of beams in the beam subset C2 are separately arranged in different extension directions and in the circumferential directions of the second axes.

In this way, the plurality of beams in the beam lookup table are distributed within the XYZ three-dimensional space range. When the directional antenna 30 rotates until the beam direction coincides with directions of a plurality of beams within the XYZ three-dimensional space range, the directional antenna 30 can cover the target device within the XYZ three-dimensional space range. The wireless router may be applied to building structures such as a villa and a duplex.

Still refer to FIG. 14. Based on the foregoing embodiment, to enable the directional antenna 30 to cover target devices at different positions within the XYZ three-dimensional space range, in some embodiments, in the circumferential direction w2 of the second axis L2, an included angle β between two adjacent beams in the beam subset is greater than or equal to a stepping precision angle used by the driving apparatus 40 to perform driving around the second axis L2, and is less than or equal to a second beam angle of the directional antenna 30.

The included angle β between the two adjacent beams in the beam subset is an included angle between maximum gain directions (namely, beam directions) of the two beams.

In addition, the stepping precision angle used by the driving apparatus 40 to perform driving around the second axis L2 is a minimum angle used by the driving apparatus 40 to perform driving around the second axis L2, and the stepping precision angle is greater than 0°.

Figure 15:
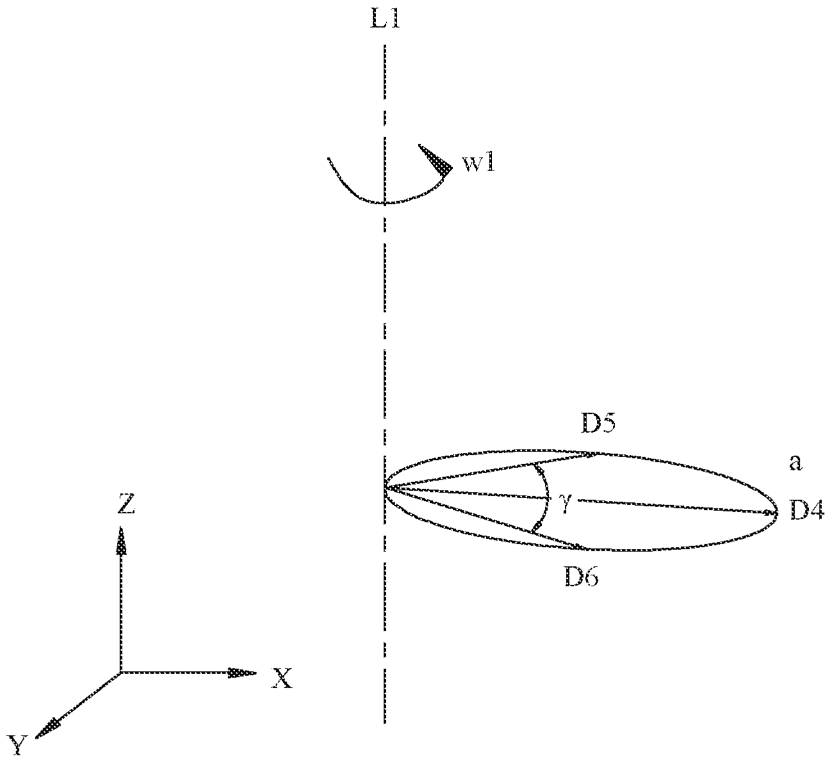
FIG. 15 is a schematic diagram of a second beam angle of a directional antenna in a wireless router according to some embodiments of this application.

In addition, the second beam angle is an included angle between two directions in which radiation powers decrease by a second preset threshold and that are located on two sides of a maximum radiation direction in a plane (for example, an XZ plane) perpendicular to the second axis L2 when the beam direction of the directional antenna 30 is perpendicular to the first axis L1. The second preset threshold may be 2 dB, 3 dB, 4 dB, 5 dB, or the like. The second preset threshold may be the same as or different from the first preset threshold. This is not specifically limited herein. The second preset threshold may be specifically selected based on an actual requirement. For example, FIG. 15 is a schematic diagram of the second beam angle of the directional antenna 30 in the wireless router 100 according to some embodiments of this application. The second beam angle of the directional antenna 30 is an included angle γ between two directions D5 and D6 that are located on two sides of a maximum radiation direction D4 in the XZ plane and in which radiation powers decrease by the second preset threshold (for example, 3 dB).

In this way, the beam lookup table is complete within the XYZ three-dimensional space range, and the beam direction of the directional antenna 30 can be adjusted to a plurality of positions within the XYZ three-dimensional space range, so that the directional antenna 30 can cover the target device at any position within the XYZ three-dimensional space range.

In some embodiments, in the circumferential direction w2 of the second axis L2, an included angle β between two adjacent beams in the beam subset is equal to a second beam angle of the directional antenna 30. In this way, a quantity of beams in the beam lookup table is small, control difficulty is low, and power consumption and a delay are low.

It should be noted that a structural form of the beam set in the beam lookup table may be any of the structural forms shown in FIG. 12 and FIG. 14, or may be another structural form. For example, the beam subset is formed by beams within a 180° range in the circumferential direction of the first axis L1 in FIG. 12. For another example, the beam subset is formed by beams within a 180° range in the circumferential direction of the first axis L1 and within a 90° range in the circumferential direction of the second axis L2 in FIG. 14. This is not specifically limited in this embodiment of this application.

According to the descriptions of the foregoing embodiments, the beam lookup table includes a plurality of beams. The following two embodiments may be used to determine the target beam from the plurality of beams. The two embodiments include the following Embodiment 1 and Embodiment 2.

Figure 16:
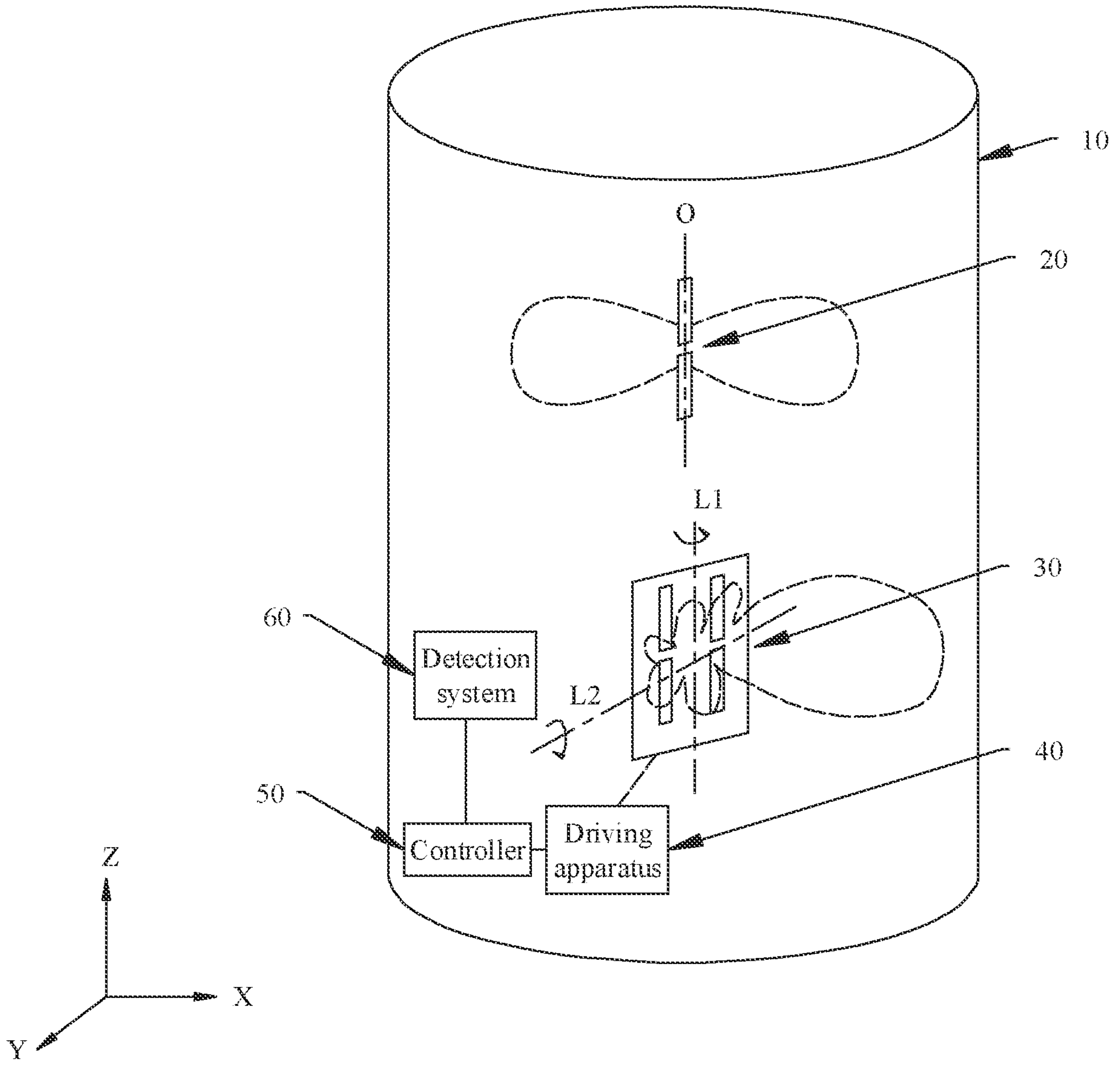
FIG. 16 is a schematic diagram of a structure of a wireless router according to some other embodiments of this application.

Embodiment 1: FIG. 16 is a schematic diagram of a structure of the wireless router 100 according to some other embodiments of this application. In this embodiment, the wireless router 100 further includes a controller 50 and a detection system 60.

The controller 50 may include a processor or a necessary logic circuit. The processor may be a baseband processor, a digital signal processor, a microprocessor, a central processing unit, or the like. The controller 50 is electrically connected to the driving apparatus 40, and the controller 50 is configured to control the driving apparatus 40 to drive the directional antenna 30 to sequentially rotate to the plurality of orientations, so that the beam direction of the directional antenna 30 separately coincides with the directions of the plurality of beams in the beam lookup table. The plurality of beams may be all beams in the beam lookup table, or may be some beams in the beam lookup table. This is not specifically limited herein.

The detection system 60 is configured to: when the beam direction of the directional antenna 30 separately coincides with the directions of the plurality of beams in the beam lookup table, detect signal quality received by the directional antenna 30 from the target device. The signal quality may be evaluated based on at least one of indicators such as received signal strength indication (received signal strength indication, RSSI), a packet error rate (PER), a throughput rate, and channel status information (channel status information, CSI). When the signal quality is comprehensively evaluated based on a plurality of indicators in these indicators, the plurality of indicators may be weighted to obtain a comprehensive indicator for evaluation, or may be separately evaluated. This is not specifically limited herein.

The controller 50 is electrically connected to the detection system 60, and the controller 50 is further configured to determine the target beam in the beam lookup table based on a plurality of pieces of signal quality obtained by the detection system 60 through detection. Optionally, when the signal quality is optimal, the controller 50 determines that a beam that is in the beam lookup table and whose direction coincides with the beam direction of the directional antenna 30 is the target beam.

The wireless router has a simple structure and requires no dedicated positioning apparatus. Therefore, costs are low.

Based on the foregoing embodiment, the controller 50 is further configured to control the driving apparatus 40 to drive the directional antenna 30 to rotate, so that the beam direction of the directional antenna 30 respectively coincides with the direction of the target beam in the beam lookup table. Therefore, automatic control is implemented, control difficulty is simplified, and driving precision is ensured.

Figure 17:
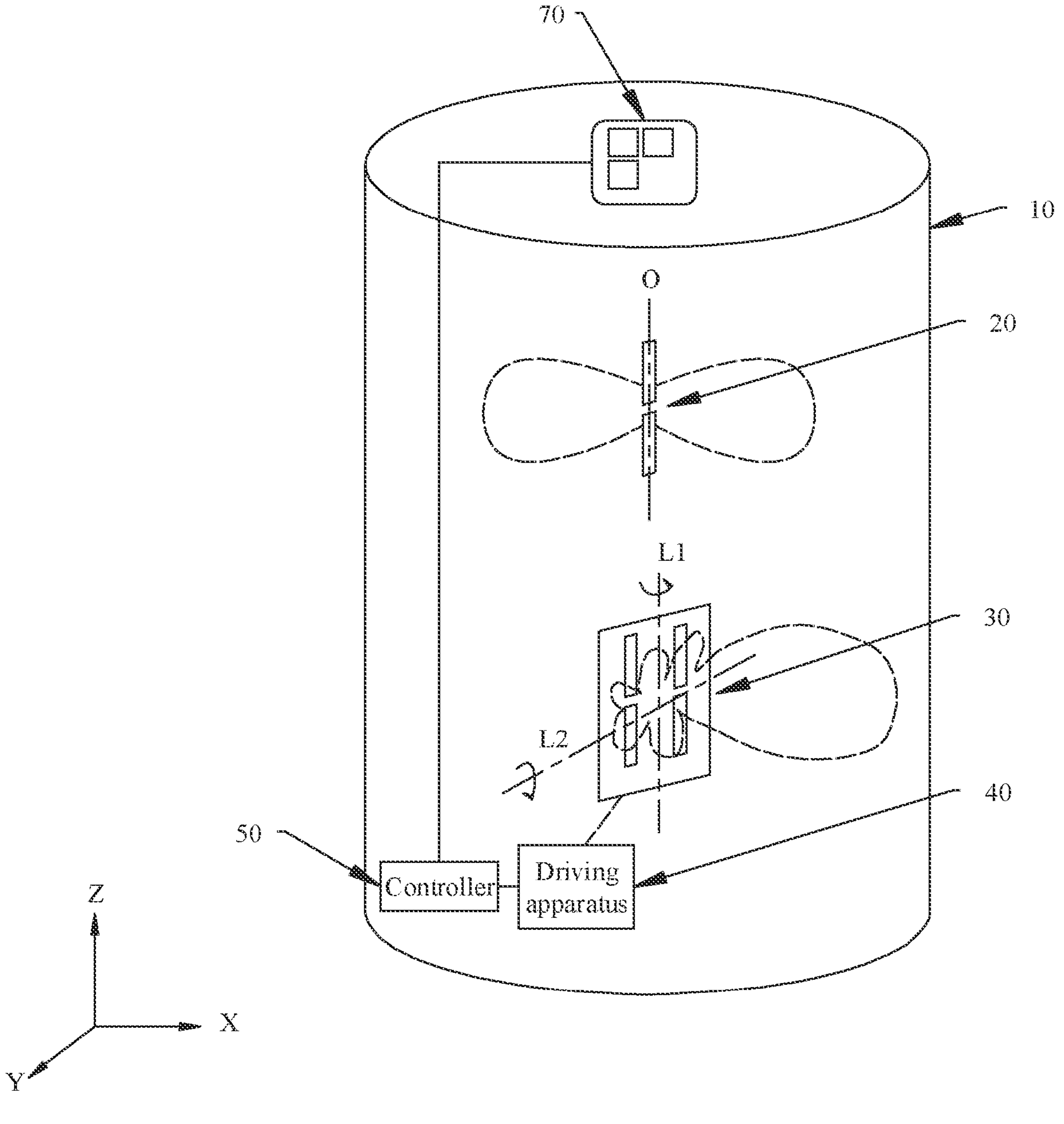
FIG. 17 is a schematic diagram of a structure of a wireless router according to some other embodiments of this application.

Embodiment 2: FIG. 17 is a schematic diagram of a structure of the wireless router 100 according to some other embodiments of this application. In this embodiment, the wireless router 100 further includes a positioning apparatus 70 and a controller 50.

The positioning apparatus 70 includes but is not limited to an ultra wideband (ultra wideband, UWB) antenna. The positioning apparatus 70 is configured to acquire position information of the target device. The controller 50 is electrically connected to the positioning apparatus 70, and the controller 50 is configured to determine the target beam in the beam lookup table based on the position information acquired by the positioning apparatus 70. Optionally, the controller 50 determines that a beam in the beam lookup table is the target beam, where a minimum included angle exists between a beam direction of the beam and a position direction of a target position relative to the wireless router. The wireless router does not need to look up the target beam through polling. Therefore, a response speed is high, and a delay time is short.

Based on the foregoing embodiment, the controller 50 is further configured to control the driving apparatus 40 to drive the directional antenna 30 to rotate, so that the beam direction of the directional antenna 30 coincides with the direction of the target beam in the beam lookup table. Therefore, automatic control is implemented, control difficulty is simplified, and driving precision is ensured.

The foregoing embodiments describe a case in which there is one omnidirectional antenna 20 and there is one directional antenna 30. Certainly, there may alternatively be a plurality of omnidirectional antennas 20 and a plurality of directional antennas 30, one omnidirectional antenna 20 and a plurality of directional antennas 30, or a plurality of omnidirectional antennas 20 and one directional antenna 30. In other words, there is at least one omnidirectional antenna 20, and there is at least one directional antenna 30.

When there are a plurality of omnidirectional antennas 20, signal transmission and reception of a plurality of different channels may be supported by using the plurality of omnidirectional antennas 20, thereby further improving application universality of the wireless router 100.

When there are a plurality of directional antennas 30, multi-user downlink concurrency may be implemented by using the plurality of directional antennas 30.

Wireless routers 100 of different specifications may be obtained by combining different quantities of omnidirectional antennas 20 and different quantities of directional antennas 30. Specifications of the wireless router 100 may be MIMO2×2, MIMO3×3, and MIMO4×4. When the specification of the wireless router 100 is MIMO2×2, a sum of a quantity of omnidirectional antennas 20 and a quantity of directional antennas 30 is two. Specifically, the quantity of omnidirectional antennas 20 is one, and the quantity of directional antennas 30 is also one. When the specification of the wireless router 100 is MIMO3×3, the sum of the quantity of omnidirectional antennas 20 and the quantity of directional antennas 30 is three. Specifically, the quantity of omnidirectional antennas 20 is one, and the quantity of directional antennas 30 is two. Alternatively, the quantity of omnidirectional antennas 20 is two, and the quantity of directional antennas 30 is one. When the specification of the wireless router 100 is MIMO4×4, the sum of the quantity of omnidirectional antennas 20 and the quantity of directional antennas 30 is four. Specifically, the quantity of omnidirectional antennas 20 is one, and the quantity of directional antennas 30 is three. Alternatively, the quantity of omnidirectional antennas 20 is two, and the quantity of directional antennas 30 is two. Alternatively, the quantity of omnidirectional antennas 20 is three, and the quantity of directional antennas 30 is one. Specifically, the specifications of the wireless router 100, and quantities of omnidirectional antennas 20 and quantities of directional antennas 30 in different specifications are recorded in Table 1.

TABLE 1

| Specification of the wireless router | Quantity of omnidirectional antennas | Quantity of directional antennas |
|---|---|---|
| MIMO 2 × 2 | 1 | 1 |
| MIMO 3 × 3 | 1 | 2 |
| | 2 | 1 |
| MIMO 4 × 4 | 1 | 3 |
| | 2 | 2 |
| | 3 | 1 |

It should be noted that Table 1 provides examples of only three specifications of the wireless router 100: MIMO 2×2, MIMO 3×3, and MIMO 4×4. Certainly, the specification of the wireless router 100 may alternatively be MIMO 5×5, MIMO 6×6, or the like. That is, in the wireless router 100, the sum of the quantity of omnidirectional antennas 20 and the quantity of directional antennas 30 is five, six, or the like.

Figure 18:
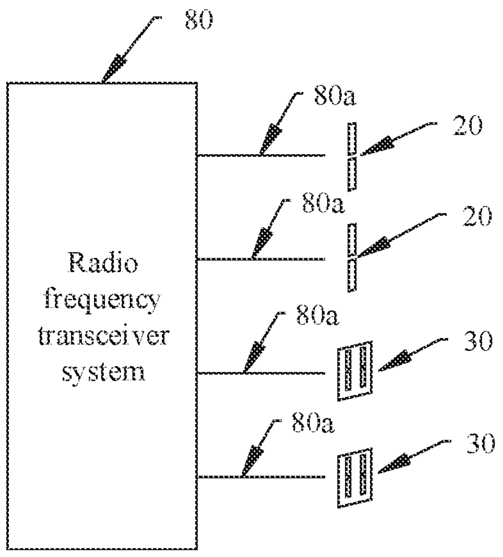
FIG. 18 is a diagram of an internal circuit of a wireless router according to some embodiments of this application.

To output a radio frequency signal to or receive a radio frequency signal from the omnidirectional antenna and the directional antenna, FIG. 18 is a diagram of an internal circuit of the wireless router 100 according to some embodiments of this application. The wireless router 100 further includes a radio frequency transceiver system 80. The radio frequency transceiver system 80 is configured to implement signal transmission and reception of the at least one omnidirectional antenna 20 and the at least one directional antenna 30. Specifically, the radio frequency transceiver system 80 has a plurality of signal output ends 80*a*, and the plurality of signal output ends 80*a* are separately electrically connected to the at least one omnidirectional antenna 20 and the at least one directional antenna 30. The radio frequency transceiver system 80 is configured to generate a radio frequency signal, and output the generated radio frequency signal to the at least one omnidirectional antenna 20 and the at least one directional antenna 30 by using the plurality of signal output ends 80*a*, to implement signal transmission. In addition, the radio frequency transceiver system 80 may further receive, by using the plurality of signal output ends 80*a*, a signal received by the at least one omnidirectional antenna 20 and the at least one directional antenna 30, to implement signal reception.

Figure 19:
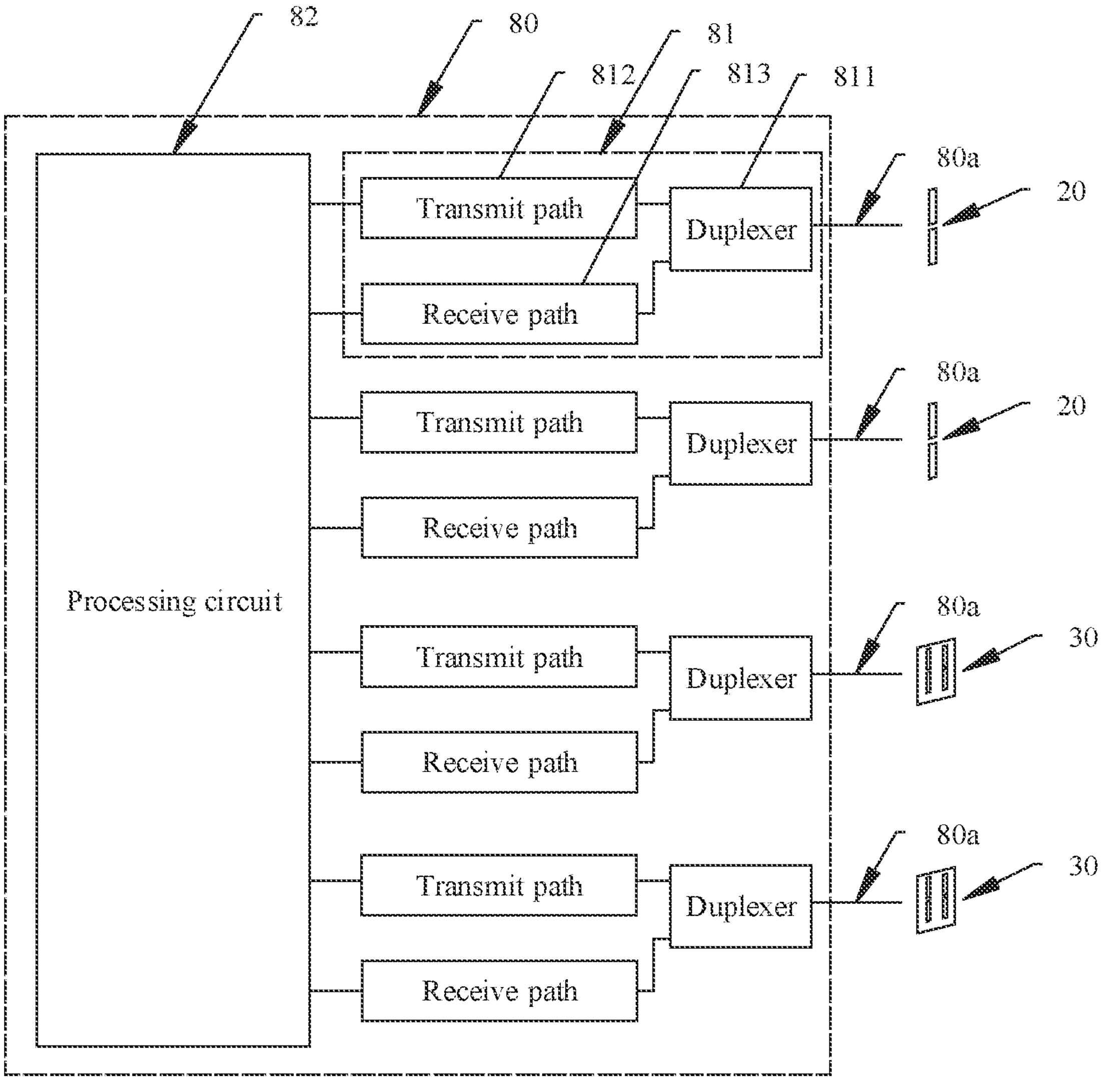
FIG. 19 is a schematic diagram of a structure of a radio frequency transceiver system in the wireless router shown in FIG. 18.

The radio frequency transceiver system 80 has a plurality of structural forms. In some embodiments, FIG. 19 is a schematic diagram of a structure of the radio frequency transceiver system 80 in the wireless router 100 shown in FIG. 18. The radio frequency transceiver system 80 includes a plurality of radio frequency transceiver links (also referred to as radio frequency transceivers or TRxs) 81. A quantity of the plurality of radio frequency transceiver links 81 is the same as a quantity of the plurality of signal output ends 80*a*, and each radio frequency transceiver link 81 has one signal output end 80*a*.

Still refer to FIG. 19. In some embodiments, the radio frequency transceiver link 81 may include a duplexer 811, a transmit path 812, and a receive path 813. Specifically, the duplexer 811 is configured to connect the transmit path 812 and the receive path 813 to the signal output end 80*a*. A back end of the radio frequency transceiver link 81 may be connected to a processing circuit 82 configured to generate a transmission signal or process a reception signal. The processing circuit 82 may include a processor or a necessary logic circuit, and is configured to perform baseband signal processing or digital signal processing. The processor may be a baseband processor, a digital signal processor, a microprocessor, a central processing unit, or the like. The processing circuit 82 may be included in the radio frequency transceiver link 81, or may be independent of the radio frequency transceiver link 81.

The duplexer 811 may be a frequency division duplexer or a time division duplexer, and is configured to couple a transmission signal to the signal output end 80*a* from the transmit path 812, and couple a reception signal to the receive path 813 from the signal output end 80*a*. Specifically, the duplexer 811 may be one or a combination of more than one of the following: a single-pole multi-throw switch, a circulator, and a filter.

The transmit path 812 is configured to receive a transmission signal from the processing circuit 82 at the back end, process the transmission signal, and transmit the transmission signal to the signal output end 80*a* by using the duplexer 811. Specifically, the transmit path 812 may include a power amplifier and/or an up-mixer. The power amplifier is configured to perform power amplification on the transmission signal transmitted in the transmit path 812. The up-mixer is also referred to as a modulator, and is configured to convert a frequency of the transmission signal transmitted in the transmit path 812 from a first frequency to a second frequency. The first frequency is less than the second frequency. Typically, the up-mixer is configured to modulate a baseband signal or an intermediate frequency signal into a radio frequency signal. If the transmit path 812 includes a power amplifier and an up-mixer, an input end of the mixer may be connected to the processing circuit 82, an output end of the mixer is connected to an input end of the power amplifier, and an output end of the power amplifier is connected to one end of the duplexer 811. Alternatively, a position of the power amplifier and a position of the up-mixer can be interchanged.

The receive path 813 is configured to process a reception signal received by the signal output end 80*a*, and transmit a processed signal to the back-end processing circuit 82. The receive path 813 may include a low noise amplifier (low noise amplifier, LNA) and a down-mixer. The LNA can amplify a weak signal received by the signal output end 80*a*, and reduce noise interference in a signal amplification process. The down-mixer is also referred to as a demodulator, and is configured to convert a frequency of the reception signal transmitted in the receive path 813 from a third frequency to a fourth frequency. The third frequency is greater than the fourth frequency. Typically, the down-mixer is configured to demodulate a radio frequency signal into a baseband signal or an intermediate frequency signal. In the receive path 813, a position of the down-mixer and a position of the LNA may be interchanged.

The quantity of signal output ends 80*a* of the radio frequency transceiver system 80 may be equal to the sum of the quantity of omnidirectional antennas 20 and the quantity of directional antennas 30. Refer to FIG. 18 and FIG. 19. For example, the quantity of omnidirectional antennas 20 is two, and the quantity of directional antennas 30 is also two. Therefore, the sum of the quantity of omnidirectional antennas 20 and the quantity of directional antennas 30 is four, and the quantity of signal output ends 80*a* of the radio frequency transceiver system 80 is also four. Based on this, in the radio frequency transceiver system 80, some signal output ends 80*a* are electrically connected to the omnidirectional antennas 20 in a one-to-one correspondence, and other signal output ends 80*a* are electrically connected to the directional antennas 30 in a one-to-one correspondence. Still refer to FIG. 18 and FIG. 19. For example, in the four signal output ends 80*a* of the radio frequency transceiver system 80, two signal output ends 80*a* are respectively electrically connected to two omnidirectional antennas 20, and the other two signal output ends 80*a* are respectively electrically connected to two directional antennas 30. In this way, signal transmission and reception of the omnidirectional antenna 20 and the directional antenna 30 in the wireless router can be implemented simultaneously.

Figure 20:
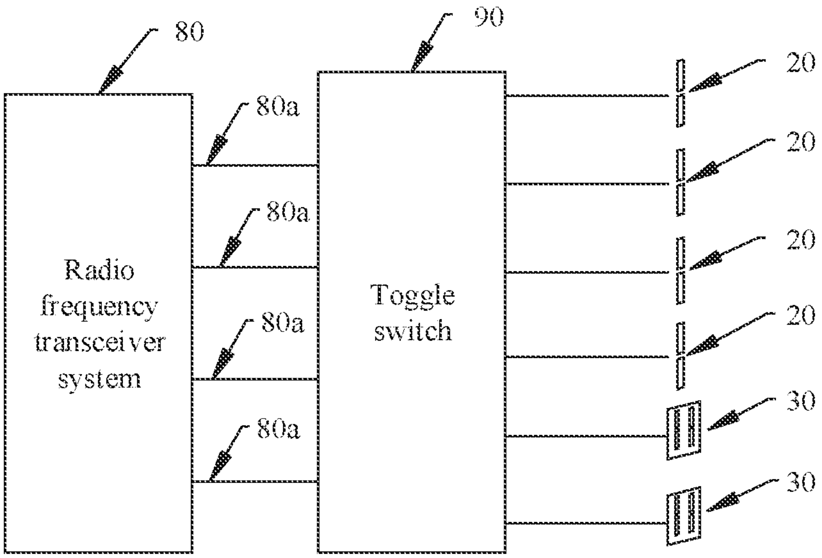
FIG. 20 is a diagram of an internal circuit of a wireless router according to some other embodiments of this application.

In some other embodiments, on a premise that the quantity of signal output ends 80*a* of the radio frequency transceiver system 80 remains unchanged, the quantity of omnidirectional antennas 20 and/or the quantity of directional antennas 30 may be increased, so that the sum of the quantity of omnidirectional antennas 20 and the quantity of directional antennas 30 is greater than the quantity of signal output ends 80*a* of the radio frequency transceiver system 80. Based on this, FIG. 20 is a diagram of an internal circuit of the wireless router 100 according to some other embodiments of this application. A toggle switch 90 is further disposed between the signal output ends 80*a* of the radio frequency transceiver system 80 and both of the omnidirectional antennas 20 and the directional antennas 30. The toggle switch 90 is configured to select the plurality of signal output ends 80*a* of the radio frequency transceiver system 80 to be respectively electrically connected to a plurality of antennas from the omnidirectional antennas 20 and the directional antennas 30, to implement switching among a plurality of use scenarios of the wireless router.

For example, when the quantity of signal output ends 80*a* of the radio frequency transceiver system 80 remains unchanged, only the quantity of omnidirectional antennas 20 is increased, so that the quantity of omnidirectional antennas 20 is equal to the quantity of signal output ends 80*a* of the radio frequency transceiver system 80, and the sum of the quantity of omnidirectional antennas 20 and the quantity of directional antennas 30 is greater than the quantity of signal output ends 80*a* of the radio frequency transceiver system 80. Specifically, the quantity of omnidirectional antennas 20 and the quantity of directional antennas 30 in the wireless router 100 in each of the specifications MIMO2×2, MIMO3×3, and MIMO4×4 are recorded in the following Table 2.

TABLE 2

| Specification of the wireless router | Quantity of omnidirectional antennas | Quantity of directional antennas |
|---|---|---|
| MIMO 2 × 2 | 2 | 1 |
| MIMO 3 × 3 | 3 | 2 |
| | | 1 |
| MIMO 4 × 4 | 4 | 3 |
| | | 2 |
| | | 1 |

In the wireless router in the specification MIMO 2×2, the quantity of signal output ends 80*a* of the radio frequency transceiver system 80 is two, and the two signal output ends 80*a* may be selectively electrically connected to two omnidirectional antennas 20 by using the toggle switch 90. In this case, simultaneous transmission and reception of two-channel signals of a common device can be met. Alternatively, the two signal output ends 80*a* may be selectively electrically connected to one omnidirectional antenna 20 and one directional antenna 30 by using the toggle switch 90. In this case, on a premise of meeting access of the common device, the wireless router 100 can serve a medium/long-distance device and a high-speed device. In this way, the wireless router has two use scenarios, and switching can be performed between the two use scenarios by using the toggle switch 90.

In the wireless router in the specification MIMO 3×3, the quantity of signal output ends 80*a* of the radio frequency transceiver system 80 is three, and the three signal output ends 80*a* may be selectively electrically connected to three omnidirectional antennas 20 by using the toggle switch 90. In this case, simultaneous transmission and reception of three-channel signals of the common device can be met. Alternatively, the three signal output ends 80*a* may be selectively electrically connected to one omnidirectional antenna 20 and two directional antennas 30 by using the toggle switch 90. In this case, on a premise of meeting access of the common device, the wireless router 100 can simultaneously serve two medium/long-distance devices or high-speed devices. Alternatively, the three signal output ends 80*a* may be selectively electrically connected to two omnidirectional antennas 20 and one directional antenna 30 by using the toggle switch 90. In this case, on a premise of meeting simultaneous transmission and reception of two-channel signals of the common device, the wireless router 100 can serve one medium/long-distance device or high-speed device. In this way, the wireless router has three use scenarios, and switching can be performed among the three use scenarios by using the toggle switch 90.

In the wireless router in the specification MIMO 4×4, the quantity of signal output ends 80*a* of the radio frequency transceiver system 80 is four, and the four signal output ends 80*a* may be selectively electrically connected to four omnidirectional antennas 20 by using the toggle switch 90. In this case, simultaneous transmission and reception of four-channel signals of the common device can be met. Alternatively, the four signal output ends 80*a* may be selectively electrically connected to one omnidirectional antenna 20 and three directional antennas 30 by using the toggle switch 90. In this case, on a premise of meeting access of the common device, the wireless router 100 can simultaneously serve three medium/long-distance devices or high-speed devices. Alternatively, the four signal output ends 80*a* may be selectively electrically connected to two omnidirectional antennas 20 and two directional antennas 30 by using the toggle switch

90. In this case, on a premise of meeting simultaneous transmission and reception of two-channel signals of the common device, the wireless router 100 can serve two medium/long-distance devices or high-speed devices. Alternatively, the four signal output ends 80*a* may be selectively electrically connected to three omnidirectional antennas 20 and one directional antenna 30 by using the toggle switch 90. In this case, on a premise of meeting simultaneous transmission and reception of three-channel signals of the common device, the wireless router 100 can serve one medium/long-distance device or high-speed device. In this way, the wireless router has four use scenarios, and switching can be performed among the four use scenarios by using the toggle switch 90.

The foregoing embodiments describe the structure of the wireless router 100. On a basis of meeting access of a common user by using the omnidirectional antenna 20, the wireless router 100 provided in the embodiments of this application further meets access of the medium/long-distance device and the high-speed device by using the directional antenna 30 with the adjustable beam direction, thereby improving application universality of the wireless router 100.

Figure 21:
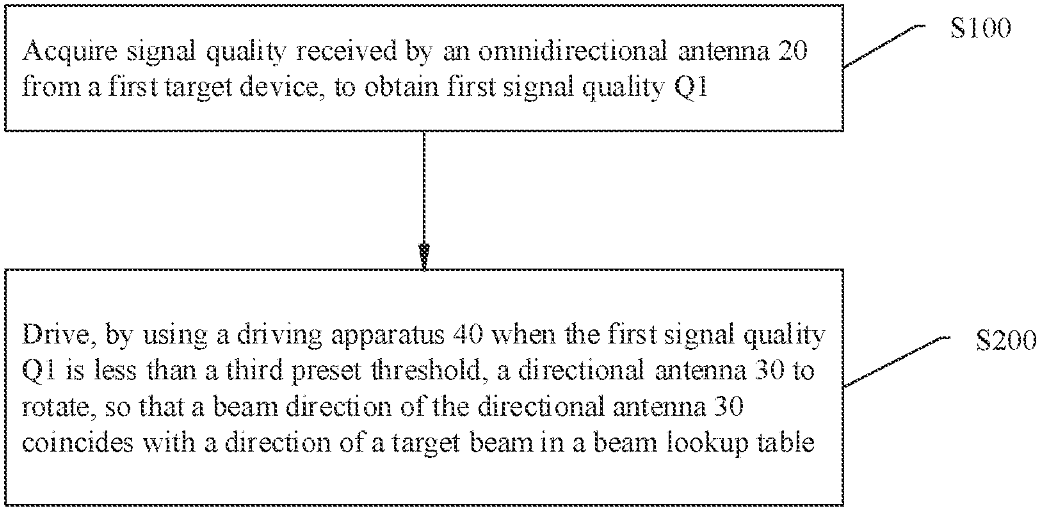
FIG. 21 is a flowchart of a control method of a wireless router according to some embodiments of this application.

This application further provides a control method of a wireless router. The control method is applicable to the wireless router 100. The wireless router 100 includes an omnidirectional antenna 20, a directional antenna 30, and a driving apparatus 40, and the driving apparatus 40 is connected to the directional antenna 30. FIG. 21 is a flowchart of a control method of a wireless router according to some embodiments of this application. The control method includes the following steps S100-S200.

Step S100: Acquire signal quality received by the omnidirectional antenna 20 from a first target device, to obtain first signal quality Q1.

The first target device is an electronic device within a coverage area of the wireless router. The electronic device includes but is not limited to a personal computer, a wireless router, a portable computer device, a mobile terminal device (for example, a PDA, a palmtop computer device, a mobile phone, or a smartphone), a smart wearable device, or a smart home device (for example, a smart television, a smart refrigerator, an air conditioner, a washing machine, or an air purifier). The smart wearable device includes but is not limited to a bracelet, a watch, AR glasses, an AR helmet, VR glasses, or a VR helmet.

In addition, the first signal quality Q1 may be evaluated based on at least one of indicators such as RSSI, a PER, a throughput rate, or CSI. When the first signal quality Q1 is comprehensively evaluated based on a plurality of indicators in these indicators, the plurality of indicators may be weighted to obtain a comprehensive indicator for evaluation, or may be separately evaluated. This is not specifically limited herein.

S200. Drive, by using the driving apparatus 40 when the first signal quality Q1 is less than a third preset threshold, the directional antenna 30 to rotate, so that a beam direction of the directional antenna 30 coincides with a direction of a target beam in a beam lookup table, where the target beam is capable of covering the first target device. Therefore, the beam direction of the directional antenna 30 is switched, so that the directional antenna 30 can cover the first target device.

The driving apparatus 40 is configured to drive the directional antenna 30 to rotate, to adjust the beam direction of the directional antenna 30, so that the directional antenna 30 can serve target devices at different positions.

In this way, on a basis of meeting access of a common device by using the omnidirectional antenna, access of a medium/long-distance weak field device and a high-speed device can be met by using the directional antenna that has a high gain and an adjustable beam direction. In this way, application universality of the wireless router can be improved. Based on this, in a process of using the driving apparatus to drive the directional antenna to rotate, the directional antenna can be adjusted to a position for covering the target device, provided that the beam direction of the directional antenna coincides with the direction of the target beam in a limited quantity of beams in the beam lookup table, and there is no need to traverse all orientations to which the directional antenna can rotate under driving of the driving apparatus. Therefore, control difficulty is low, and power consumption and a delay are low.

In some embodiments, the driving apparatus 40 is configured to drive the directional antenna 30 to rotate around a first axis L1. Optionally, the first axis is parallel to a central axis O of the omnidirectional antenna 20. Because the central axis O of the omnidirectional antenna 20 usually extends in a height direction of the wireless router (namely, a Z-axis direction), the first axis L1 also extends in the height direction of the wireless router. In this way, the driving apparatus 40 can adjust the beam direction of the directional antenna 30 in a horizontal plane (namely, an XY plane), so that the directional antenna 30 can serve target devices at different positions in the horizontal plane. Therefore, the wireless router can be applicable to a large flat house building structure.

Based on the foregoing embodiment, optionally, the driving apparatus 40 is further configured to drive the directional antenna 30 to rotate around a second axis L2, where the second axis L2 is perpendicular to the first axis L1, and the second axis L2 is further perpendicular to the beam direction of the directional antenna 30. The beam direction of the directional antenna 30 changes when the directional antenna 30 rotates around the first axis L1. Therefore, an extension direction of the second axis L2 also changes with a change of the beam direction of the directional antenna 30. In this way, the driving apparatus 40 can adjust the beam direction of the directional antenna 30 within a three-dimensional space range, so that the directional antenna 30 can serve target devices at different positions within the three-dimensional space range. Therefore, the wireless router can be applicable to building structures such as a villa and a duplex.

The driving apparatus 40 has a plurality of structural forms. Specifically, the driving apparatus 40 may include a rotary motor or a combination of a rotary motor and a transmission apparatus, for example, a gear transmission apparatus, a belt transmission apparatus, a pneumatic transmission apparatus, or a hydraulic transmission apparatus. This is not specifically limited in this application.

The beam lookup table includes a set formed by beams w % ben the directional antenna 30 rotates to a plurality of different orientations under driving of the driving apparatus 40. In other words, the beam lookup table includes a set formed by a plurality of beams. The plurality of beams are respectively beams acquired when the directional antenna 30 rotates to the plurality of different orientations under driving of the driving apparatus 40.

When the driving apparatus 40 is configured to drive the directional antenna 30 to rotate around the first axis L1, the plurality of beams in the beam lookup table form a plurality of beam subsets arranged in a circumferential direction of the first axis L1, and each beam subset includes at least a first beam a whose direction is perpendicular to the first axis L1.

The first beams a of the plurality of beam subsets are respectively beams acquired when the directional antenna 30 rotates around the first axis L1 to the plurality of different orientations under driving of the driving apparatus 40. In this way, when the directional antenna 30 rotates until the beam direction coincides with directions of the plurality of first beams a, the directional antenna 30 can cover the target device in the XY plane. The wireless router may be applied to a large flat building structure.

To ensure that the beam lookup table is complete in the XY plane, in some embodiments, in the circumferential direction w1 of the first axis L1, an included angle α between first beams a in two adjacent beam subsets is greater than or equal to a stepping precision angle used by the driving apparatus 40 to perform driving around the first axis L1, and is less than or equal to a first beam angle of the directional antenna 30. The included angle α between the first beams a in the two adjacent beam subsets is an included angle between maximum gain directions (namely, beam directions) of the two first beams a. In addition, the stepping precision angle used by the driving apparatus 40 to perform driving around the first axis L1 is a minimum angle used by the driving apparatus 40 to perform driving around the first axis L1, and the stepping precision angle is greater than 0°. In addition, the first beam angle is an included angle between two directions in which radiation powers decrease by a first preset threshold and that are located on two sides of a maximum radiation direction in a plane (namely, the XY plane) perpendicular to the first axis L1 when the beam direction of the directional antenna 30 is perpendicular to the first axis L1. The first preset threshold may be 2 dB, 3 dB, 4 dB, 5 dB, or the like. This is not specifically limited herein. The first preset threshold may be specifically selected based on an actual requirement. In this way, the beam lookup table is complete within a 360° range in the circumferential direction of the first axis L1, and the beam direction of the directional antenna 30 can be adjusted to a plurality of positions within the 360° range in the circumferential direction of the first axis L1, so that the directional antenna 30 can cover the target device at any position in the XY plane.

In some embodiments, in the circumferential direction w1 of the first axis L1, an included angle α between first beams a in two adjacent beam subsets is equal to a first beam angle of the directional antenna 30. In this way, a quantity of beams in the beam lookup table is small, control difficulty is low, and power consumption and a delay are low.

When the driving apparatus 40 is configured to drive the directional antenna 30 to rotate around the first axis L1, and is further configured to drive the directional antenna 30 to rotate around the second axis L2, the plurality of beams in the beam lookup table form the plurality of beam subsets arranged in the circumferential direction of the first axis L1, the beam subset includes a plurality of beams arranged in a circumferential direction of the second axis L2, and the first beam a is one of the plurality of beams. The second axis L2 is perpendicular to the beam direction of the directional antenna 30, and the beam direction of the directional antenna 30 changes when the directional antenna 30 rotates around the first axis L1. Therefore, an extension direction of the second axis L2 also changes with a change of the beam direction of the directional antenna 30. In this way, a plurality of beams in different beam subsets are arranged in different extension directions and in the circumferential direction of the second axis. In this way, the plurality of beams in the beam lookup table are distributed within an XYZ three-dimensional space range. When the directional antenna 30 rotates until the beam direction coincides with directions of a plurality of beams within the XYZ three-dimensional space range, the directional antenna 30 can cover the target device within the XYZ three-dimensional space range. The wireless router may be applied to building structures such as a villa and a duplex.

To ensure that the beam lookup table is complete within the XYZ three-dimensional space range, in some embodiments, in the circumferential direction w1 of the first axis L1, an included angle α between first beams a in two adjacent beam subsets is greater than or equal to a stepping precision angle used by the driving apparatus 40 to perform driving around the first axis L1, and is less than or equal to a first beam angle of the directional antenna 30. Based on this, in the circumferential direction w2 of the second axis L2, an included angle β between two adjacent beams in the beam subset is greater than or equal to a stepping precision angle used by the driving apparatus 40 to perform driving around the second axis L2, and is less than or equal to a second beam angle of the directional antenna 30. The included angle θ between the two adjacent beams in the beam subset is an included angle between maximum gain directions (namely, beam directions) of the two beams. In addition, the stepping precision angle used by the driving apparatus 40 to perform driving around the second axis L2 is a minimum angle used by the driving apparatus 40 to perform driving around the second axis L2, and the stepping precision angle is greater than 0°. In addition, the second beam angle is an included angle between two directions in which radiation powers decrease by a second preset threshold and that are located on two sides of a maximum radiation direction in a plane (for example, an XZ plane) perpendicular to the second axis L2 when the beam direction of the directional antenna 30 is perpendicular to the first axis L1. The second preset threshold may be 2 dB, 3 dB, 4 dB, 5 dB, or the like. The second preset threshold may be the same as or different from the first preset threshold. This is not specifically limited herein. The second preset threshold may be specifically selected based on an actual requirement. In this way, the beam lookup table is complete within the XYZ three-dimensional space range, and the beam direction of the directional antenna 30 can be adjusted to a plurality of positions within the XYZ three-dimensional space range, so that the directional antenna 30 can cover the target device at any position within the XYZ three-dimensional space range.

In some embodiments, in the circumferential direction w1 of the first axis L1, an included angle α between first beams a in two adjacent beam subsets is equal to a first beam angle of the directional antenna 30. In addition, in the circumferential direction w2 of the second axis L2, an included angle θ between two adjacent beams in the beam subset is equal to a second beam angle of the directional antenna 30. In this way, a quantity of beams in the beam lookup table is small, control difficulty is low, and power consumption and a delay are low.

Figure 22:
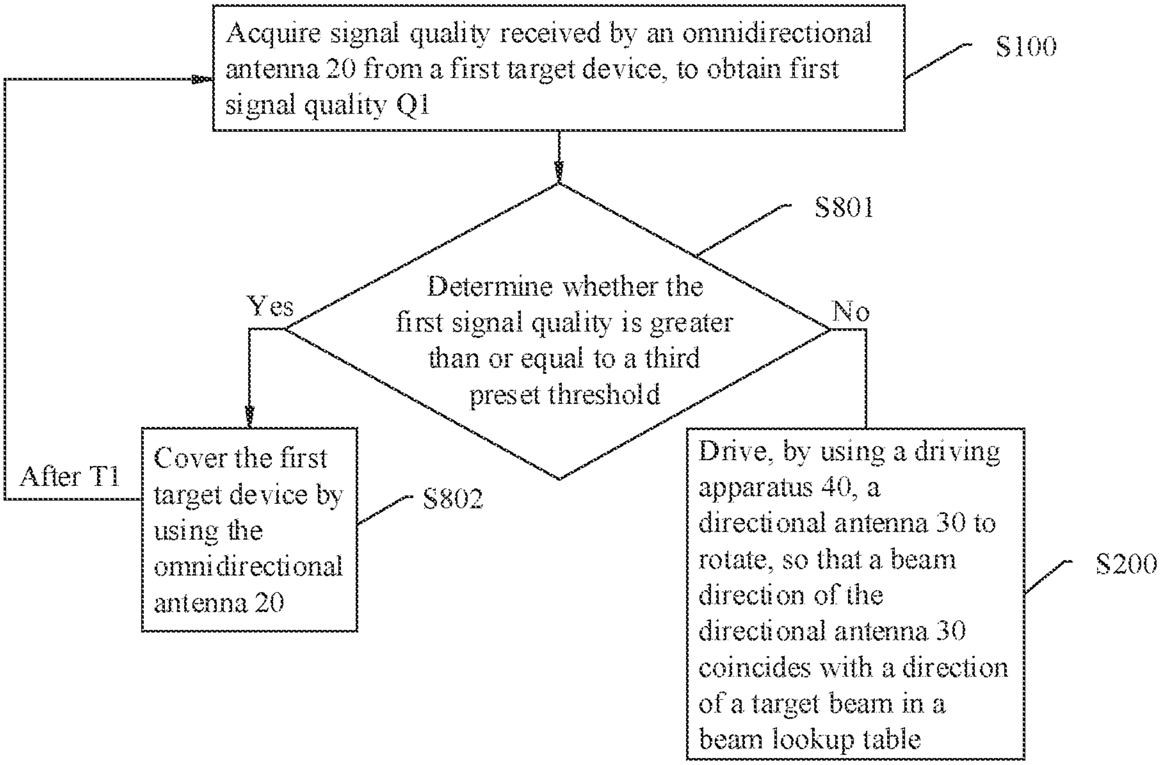
FIG. 22 is a flowchart of a control method of a wireless router according to some other embodiments of this application.

In some embodiments, FIG. 22 is a flowchart of a control method of a wireless router according to some other embodiments of this application. After step S100, the control method further includes:

Step S801: Determine whether the first signal quality is greater than or equal to the third preset threshold.

Step S802: When the first signal quality is greater than or equal to the third preset threshold, cover, by using the omnidirectional antenna 20, the first target device for operating. When the first signal quality is greater than or equal to the third preset threshold, the first target device may be covered by using the omnidirectional antenna and the directional antenna, the directional antenna may not be used, or the directional antenna is used to cover another target device. Therefore, proper resource configuration can be implemented. In some embodiments, step S802 includes: delivering parameters to a radio frequency transceiver link of the omnidirectional antenna 20, where the parameters include but are not limited to a transmit power and a protocol software parameter; entering a standard operating state. After the omnidirectional antenna 20 covers the first target device for a first preset time T1, return to step S100 to enter a next cycle. The first preset time T3 may be duration of the standard operating state in step S802. The first preset time T1 includes but is not limited to 0.1 second (s), 0.2 s, or 0.3 s. This is not specifically limited herein.

Figure 23:
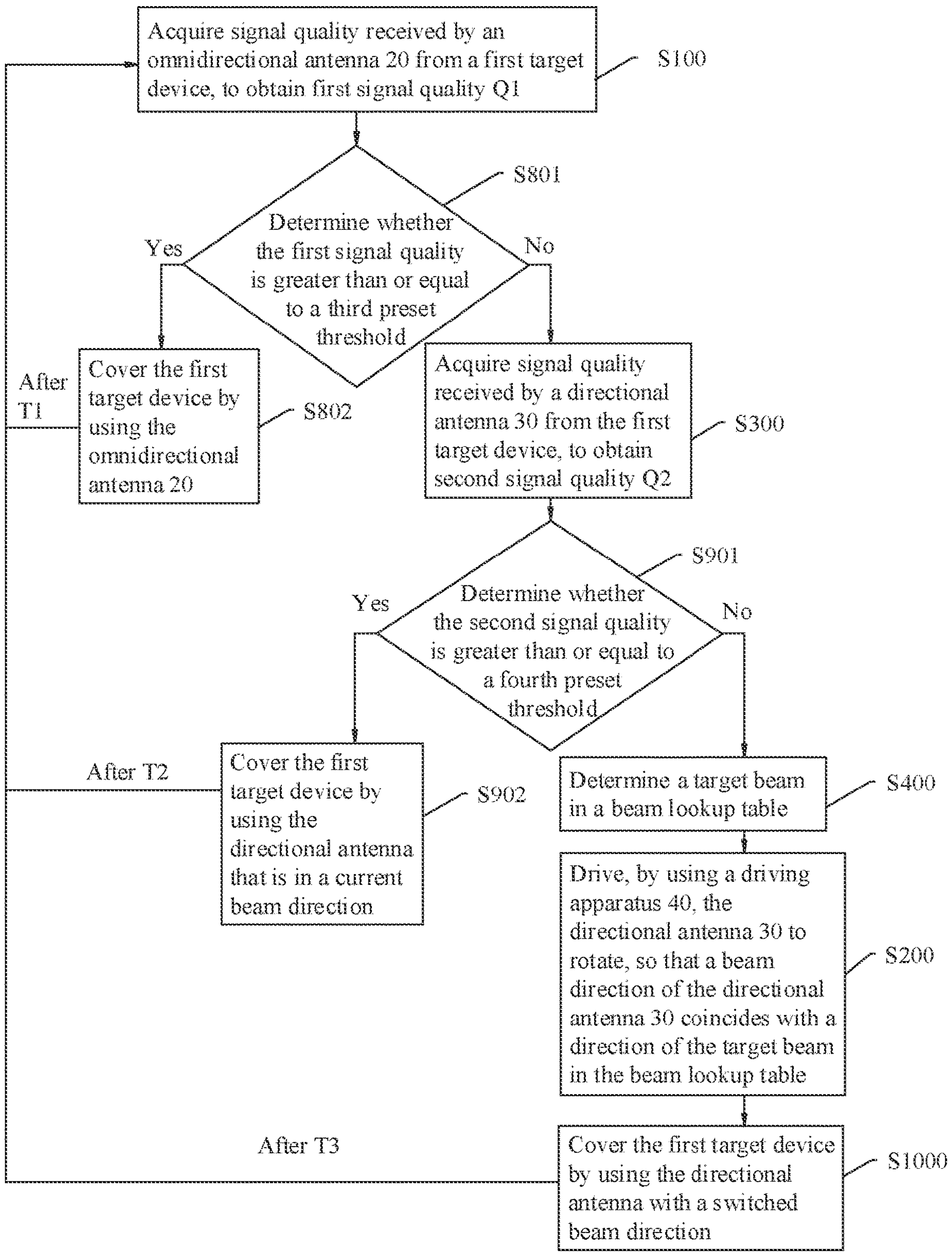
FIG. 23 is a flowchart of a control method of a wireless router according to some other embodiments of this application.

In some embodiments, FIG. 23 is a flowchart of a control method of a wireless router according to some other embodiments of this application. The control method further includes:

Step S300: Acquire signal quality received by the directional antenna 30 from the first target device, to obtain second signal quality Q2. Based on this, step S200 includes: driving, by using the driving apparatus 40 when the first signal quality Q1 is less than the third preset threshold and the second signal quality Q2 is less than a fourth preset threshold, the directional antenna 30 to rotate, so that the beam direction of the directional antenna 30 coincides with the direction of the target beam in the beam lookup table. In this way, after the omnidirectional antenna 20 and the directional antenna 30 that is in a current beam direction cannot cover the first target device, the beam direction of the directional antenna 30 is switched, so that the first target device can be quickly covered, thereby reducing a delay and power consumption in most use scenarios.

In the foregoing embodiment, the second signal quality Q2 may also be evaluated based on at least one of indicators such as RSSI, a PER, a throughput rate, or CSI. When the second signal quality Q2 is comprehensively evaluated based on a plurality of indicators in these indicators, the plurality of indicators may be weighted to obtain a comprehensive indicator for evaluation, or may be separately evaluated. This is not specifically limited herein. Evaluation indicators of the second signal quality Q2 may be the same as or different from evaluation indicators of the first signal quality Q1. For example, when the first signal quality Q1 is comprehensively evaluated based on a comprehensive indicator acquired after the RSSI, the PER, the throughput rate, and the CSI are weighted, the second signal quality Q2 is also comprehensively evaluated based on a comprehensive indicator acquired after the RSSI, the PER, the throughput rate, and the CSI are weighted, and weighted values of the indicators are the same. In this way, the evaluation indicators of the first signal quality Q1 are the same as the evaluation indicators of the second signal quality Q2. If the weighted values are different, the evaluation indicators of the first signal quality Q1 are different from the evaluation indicators of the second signal quality Q2.

In the control method shown in FIG. 23, step S300 may be operated simultaneously with step S100, may be operated after step S100, or may be operated before step S100. This is not specifically limited herein. In some embodiments, step S300 is performed after step S100. Specifically, step S300 includes: when the first signal quality is less than the third preset threshold, acquiring the signal quality received by the directional antenna from the first target device. In this way, the omnidirectional antenna is preferentially considered to be used to cover the first target device. When the omnidirectional antenna cannot cover the first target device, the directional antenna is used to cover the first target device, thereby reducing a delay and power consumption in most use scenarios.

Still refer to FIG. 23. In some embodiments, after step S300, the control method further includes the following step S901 and step S902.

Step S901: Determine whether the second signal quality is greater than or equal to the fourth preset threshold.

Step S902: When the second signal quality is greater than or equal to the fourth preset threshold, cover, by using the directional antenna that is in a current beam direction, the first target device. In this way, the first target device is covered by using the directional antenna that is in the current beam direction. The first target device is covered without rotating the directional antenna. Therefore, the delay and the power consumption are low. In some embodiments, step S902 includes: delivering parameters to a radio frequency transceiver link of the directional antenna 30, where the parameters include but are not limited to a transmit power and a protocol software parameter; entering a standard operating state. After the directional antenna 30 covers the first target device for a second preset time T2, return to step S100 to enter a next cycle. The second preset time T2 may be duration of the standard operating state in step S902. The second preset time T2 includes but is not limited to 0.1 s, 0.2 s, or 0.3 s. This is not specifically limited herein. In addition, the second preset time T2 may be the same as or different from the first preset time T1. This is not specifically limited herein. Still refer to FIG. 23. Based on this, step S200 is performed after step S901.

Figure 24A:
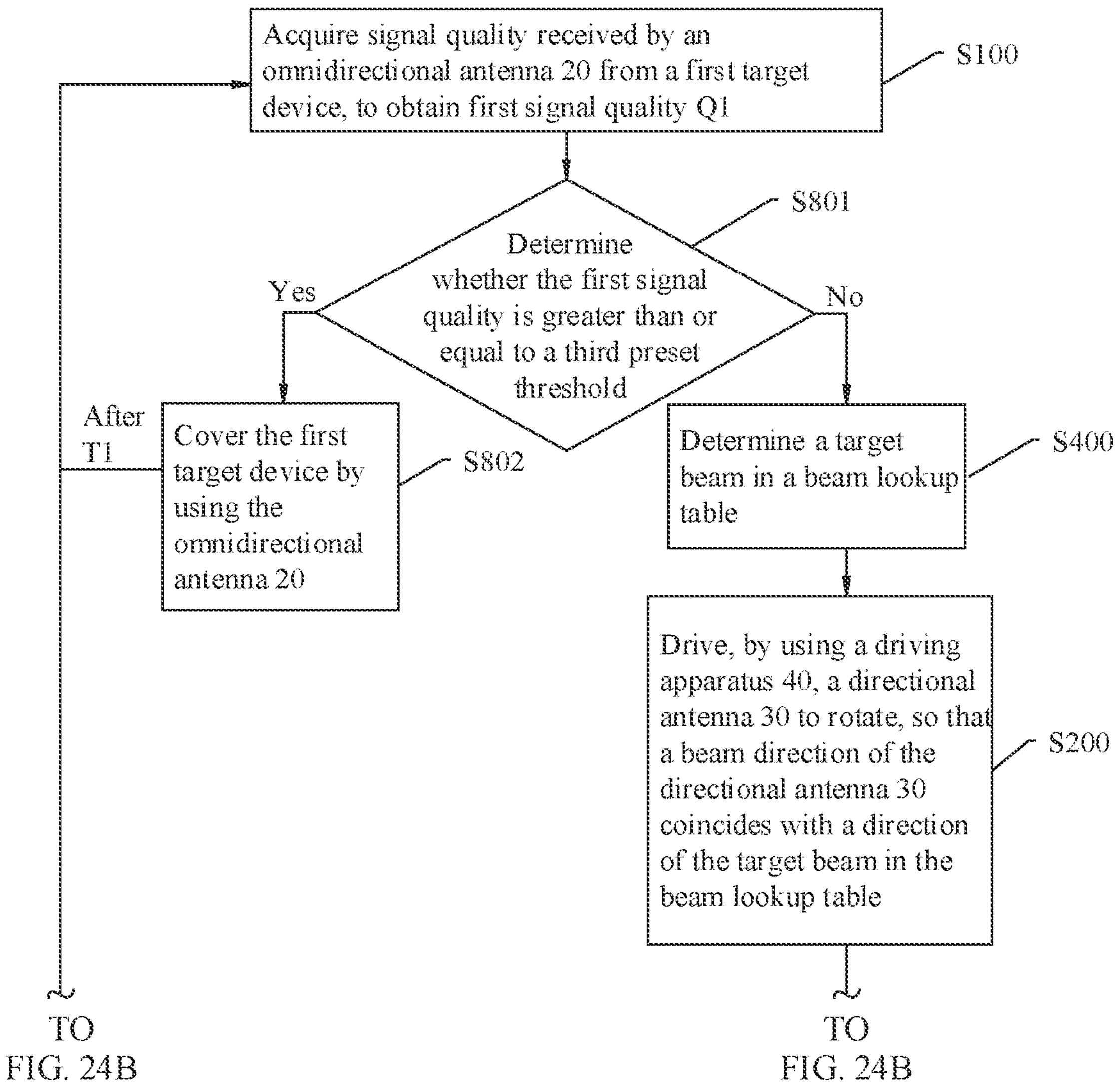
FIG. 24A and FIG. 24B are a flowchart of a control method of a wireless router according to some other embodiments of this application.
Figure 24B:
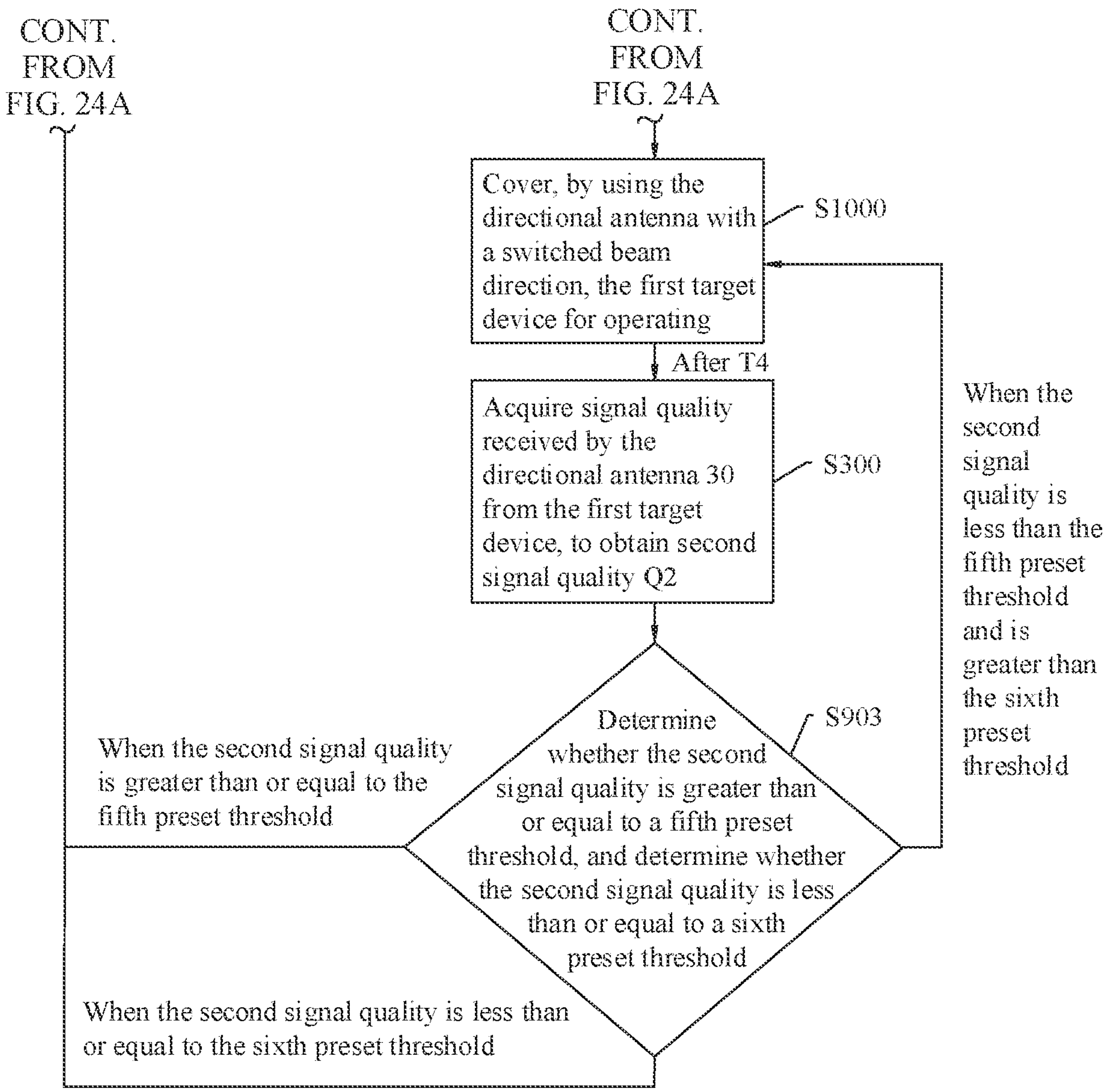

Still refer to FIG. 23. In some embodiments, after step S200, the control method further includes step S1000. Step S1000: Cover, by using the directional antenna 30 with a switched beam direction, the first target device for operating. Specifically, step S1000 may include: delivering parameters to a radio frequency transceiver link of the directional antenna 30, where the parameters include but are not limited to a transmit power and a protocol software parameter; entering a standard operating state. The step of delivering the parameters to the radio frequency transceiver link of the directional antenna 30 may be performed after beam direction switching, may be performed before beam direction switching, or may be performed simultaneously with beam direction switching. This is not specifically limited herein. After the directional antenna 30 covers the first target device for a third preset time T3, return to step S100 to enter a next cycle. The third preset time T3 may be duration of the standard operating state in step S1000. The third preset time T3 includes but is not limited to 0.1 s, 0.2 s, or 0.3 s. This is not specifically limited herein. In addition, the third preset time T3 may be the same as or different from the first preset time T1 and the second preset time T2. This is not specifically limited herein. FIG. 24A and FIG. 24B are a flowchart of a control method of a wireless router according to some other embodiments of this application. In this embodiment, after step S200, the control method further includes step S1000. Step S1000: Cover, by using the directional antenna with a switched beam direction, the first target device for operating.

Still refer to FIG. 24A and FIG. 24B. In some embodiments, step S300 is performed after step S1000 is operated for a preset time T4. The preset time T4 includes but is not limited to 0.1 s, 0.2 s, or 0.3 s. This is not specifically limited herein. Based on this, after step S300, the control method further includes step S903 and step S904. Step S903: Determine whether the second signal quality is greater than or equal to a fifth preset threshold. Step S903: When the second signal quality is greater than or equal to the fifth preset threshold, re-enter step S100. In this way, whether the omnidirectional antenna 20 can cover the first target device can be redetermined when the signal quality is improved, to implement proper resource configuration.

Still refer to FIG. 24A and FIG. 24B. In some embodiments, step S903 further includes: determining whether the second signal quality is less than or equal to a sixth preset threshold, where the sixth preset threshold is less than the fifth preset threshold. The step of determining whether the second signal quality is less than or equal to the sixth preset threshold may be performed after the step of determining whether the second signal quality is greater than or equal to the fifth preset threshold, may be performed before the step of determining whether the second signal quality is greater than or equal to the fifth preset threshold, or may be performed simultaneously with the step of determining whether the second signal quality is greater than or equal to the fifth preset threshold. This is not specifically limited herein. Still refer to FIG. 24A and FIG. 24B. Based on this, after step S903, the control method further includes: when the second signal quality is less than or equal to the sixth preset threshold, re-entering step S100. In this way, when the signal quality deteriorates, an optimal antenna can be searched for again for coverage.

Still refer to FIG. 24A and FIG. 24B. In some embodiments, after step S903, the control method further includes: when the second signal quality is less than the fifth preset threshold, and the second signal quality is greater than the sixth preset threshold, maintaining step S1000 for operating.

Still refer to FIG. 23 or FIG. 24A and FIG. 24B. In some embodiments, before the driving, by using the driving apparatus 40 when the first signal quality Q1 is less than the third preset threshold and the second signal quality Q2 is less than a fourth preset threshold, the directional antenna 30 to rotate, so that the beam direction of the directional antenna 30 coincides with the direction of the target beam in the beam lookup table, the control method further includes the following step S400.

Step S400: Determine the target beam in the beam lookup table. Step S400 is performed after step S100 and step S200.

Figure 25:
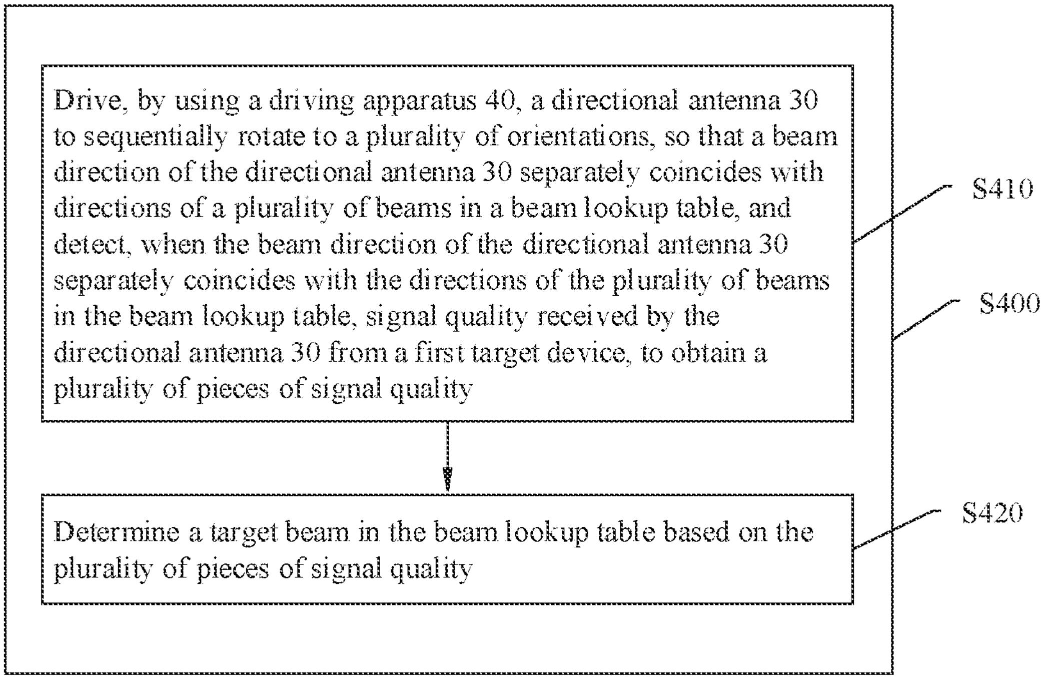
FIG. 25 is a flowchart of a target beam determining method in the control method shown in FIG. 23 or FIG. 24A and FIG. 24B.

In some embodiments, FIG. 25 is a flowchart of a target beam determining method in the control method shown in FIG. 23 or FIG. 24A and FIG. 24B. In this embodiment, step S400 includes the following step S410 and step S420.

Step S410: Drive, by using the driving apparatus 40, the directional antenna 30 to sequentially rotate to the plurality of orientations, so that the beam direction of the directional antenna 30 separately coincides with directions of the plurality of beams in the beam lookup table, and detect, when the beam direction of the directional antenna 30 coincides with the directions of the plurality of beams in the beam lookup table, the signal quality received by the directional antenna 30 from the first target device, to obtain a plurality of pieces of signal quality. The plurality of beams in the beam lookup table may be all beams in the beam lookup table, or may be some beams in the beam lookup table. This is not specifically limited herein.

Step S420: Determine the target beam in the beam lookup table based on the plurality of pieces of signal quality.

In this way, the target beam is determined in the beam lookup table in a polling lookup manner. This method is simple and easy to implement.

Figure 26:
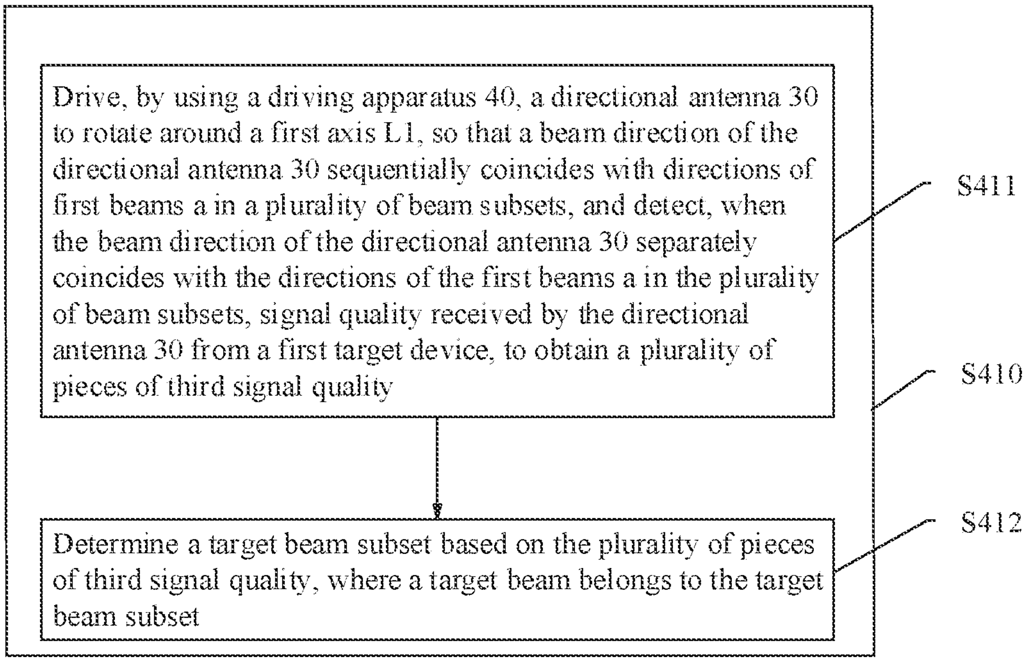
FIG. 26 is a flowchart of a method of step S410 in the target beam determining method shown in FIG. 25.

When the driving apparatus 40 is configured to drive the directional antenna 30 to rotate around the first axis L1, the plurality of beams in the beam lookup table form a plurality of beam subsets, the plurality of beam subsets are arranged in the circumferential direction of the first axis L1, and the beam subset includes at least a first beam a whose direction is perpendicular to the first axis L1. Based on this, FIG. 26 is a flowchart of a method of step S410 in the target beam determining method shown in FIG. 25. Step S410 includes the following step S411 and step S412.

Step S411: Drive, by using the driving apparatus 40, the directional antenna 30 to rotate around the first axis L1, so that the beam direction of the directional antenna 30 separately coincides with directions of the first beams a in the plurality of beam subsets, and detect, when the beam direction of the directional antenna 30 separately coincides with the directions of the first beams a in the plurality of beam subsets, the signal quality received by the directional antenna 30 from the first target device, to obtain a plurality of pieces of third signal quality. Each beam subset includes a first beam a. Therefore, the first beams a in the plurality of beam subsets refer to a plurality of first beams a, and the plurality of first beams a respectively belong to the plurality of beam subsets.

Step S412: Determine a target beam subset based on the plurality of pieces of third signal quality, where the target beam belongs to the target beam subset.

In some embodiments, step S412 may include: determining optimal third signal quality from the plurality of pieces of third signal quality; and determining, based on the optimal third signal quality, that a beam subset in which a first beam a corresponding to the optimal third signal quality is located is the target beam subset. It should be noted that the first beam a corresponding to the optimal third signal quality is a first beam a whose direction coincides with the beam direction of the directional antenna 30 when detected third signal quality is the optimal third signal quality.

In this way, when the directional antenna 30 rotates until the beam direction coincides with directions of the plurality of first beams a, the directional antenna 30 can cover the target device in the XY plane. The wireless router may be applied to a large flat building structure.

Figure 27:
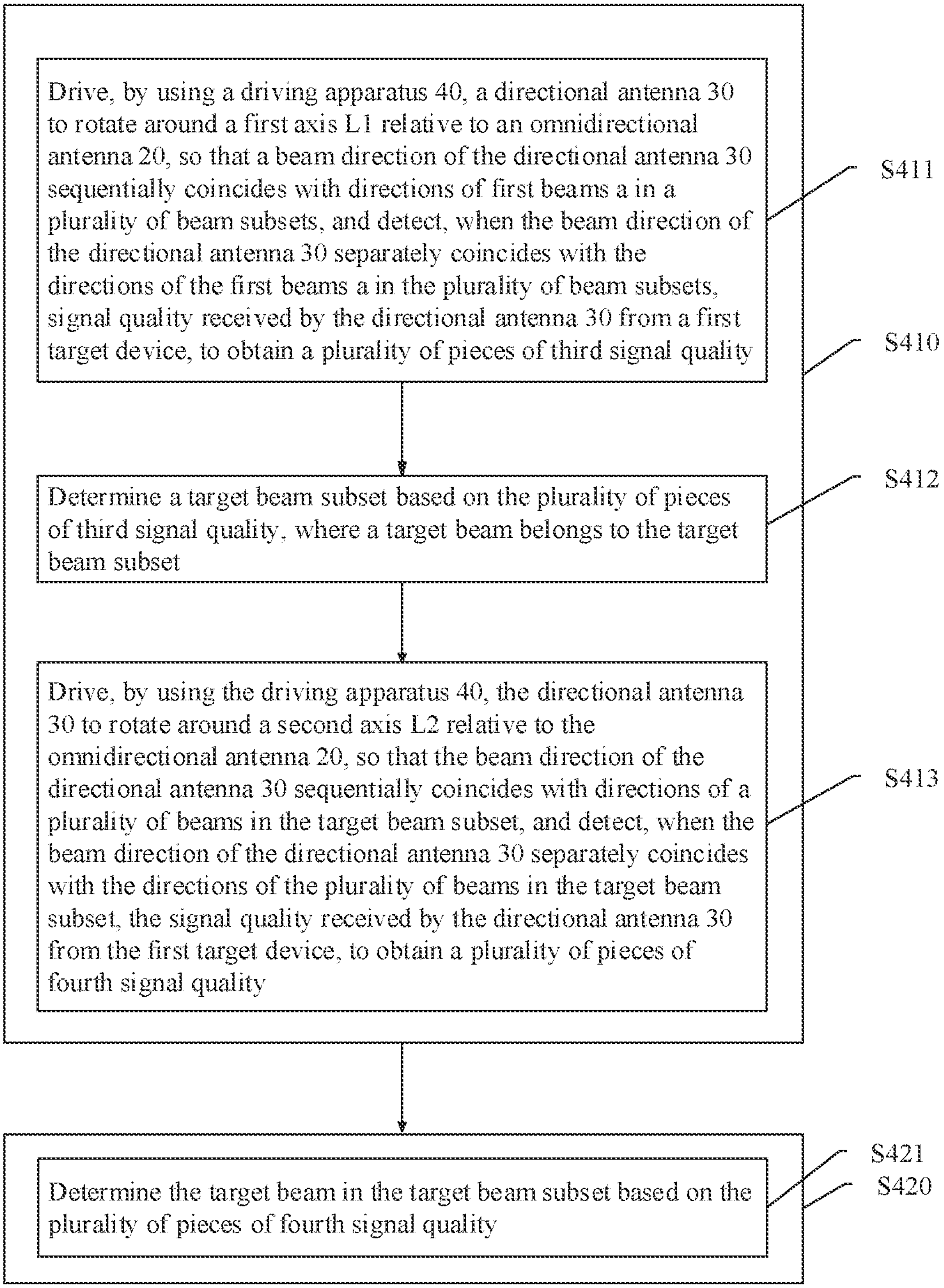
FIG. 27 is a flowchart of still another method of step S410 in the target beam determining method shown in FIG. 25.

Based on the foregoing embodiment, when the driving apparatus 40 is further configured to drive the directional antenna 30 to rotate around the second axis L2, the beam subset includes a plurality of beams arranged in the circumferential direction of the second axis L2, and the first beam a is one of the plurality of beams. Based on this, FIG. 27 is a flowchart of still another method of step S410 in the target beam determining method shown in FIG. 25. After step S412, step S410 further includes the following step S413.

Step S413: Drive, by using the driving apparatus 40, the directional antenna 30 to rotate around the second axis L2, so that the beam direction of the directional antenna 30 separately coincides with directions of a plurality of beams in the target beam subset, and detect, w % ben the beam direction of the directional antenna 30 separately coincides with the directions of the plurality of beams in the target beam subset, the signal quality received by the directional antenna 30 from the first target device, to obtain a plurality of pieces of fourth signal quality.

Still refer to FIG. 27. Based on the foregoing embodiment, step S420 includes the following step S421.

Step S421: Determine the target beam in the target beam subset based on the plurality of pieces of fourth signal quality.

In some embodiments, step S421 may include: determining optimal fourth signal quality from the plurality of pieces of fourth signal quality; and determining, based on the optimal fourth signal quality, that a beam corresponding to the optimal fourth signal quality is the target beam. It should be noted that the beam corresponding to the optimal fourth signal quality is a beam that is in the target beam subset and whose direction coincides with the beam direction of the directional antenna 30 when detected fourth signal quality is the optimal fourth signal quality.

In this way, the plurality of beams in the beam lookup table are distributed within the XYZ three-dimensional space range. When the directional antenna 30 rotates until the beam direction coincides with directions of a plurality of beams within the XYZ three-dimensional space range, the directional antenna 30 can cover the target device within the XYZ three-dimensional space range. The wireless router may be applied to building structures such as a villa and a duplex.

Figure 28:
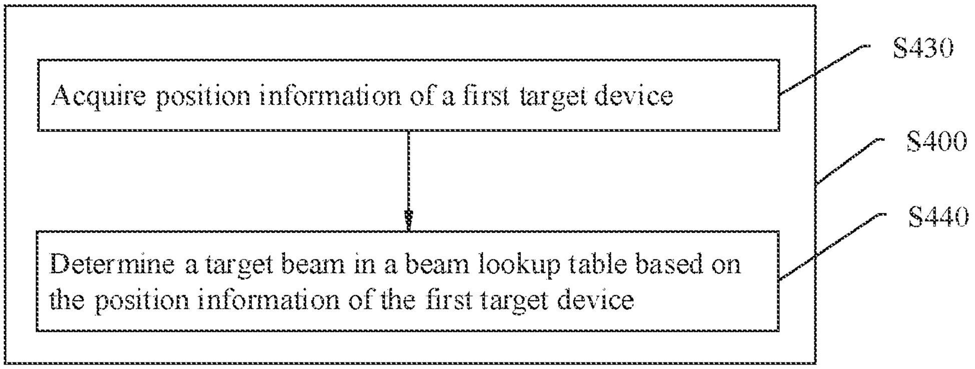
FIG. 28 is a flowchart of still another target beam determining method in the control method shown in FIG. 23 or FIG. 24A and FIG. 24B.

FIG. 28 is a flowchart of still another target beam determining method in the control method shown in FIG. 23 or FIG. 24A and FIG. 24B. In this embodiment, step S400 includes the following step S430 and step S440.

Step S430: Acquire position information of the first target device.

Step S440: Determine the target beam in the beam lookup table based on the position information of the first target device.

In this way, the wireless router does not need to look up the target beam through polling, and can quickly determine the target beam with a fast response and a short delay time.

In some embodiments, step S440 may include: determining, based on the position information of the first target device, that a beam in the beam lookup table is the target beam, where a minimum included angle exists between a beam direction of the beam and a position direction of the first target device relative to the wireless router. In this way, a coverage effect of the directional antenna 30 on the first target device is good.

The control method described in the plurality of embodiments is implemented based on an objective of covering the first target device. When there are a plurality of target devices, priorities of the plurality of target devices may be determined based on a network type, a device type, and device use information (including but not limited to a use time and a use probability) of each of the target devices. The wireless router covers a target device with a highest priority, thereby improving rationality of beam switching.

Figure 29:
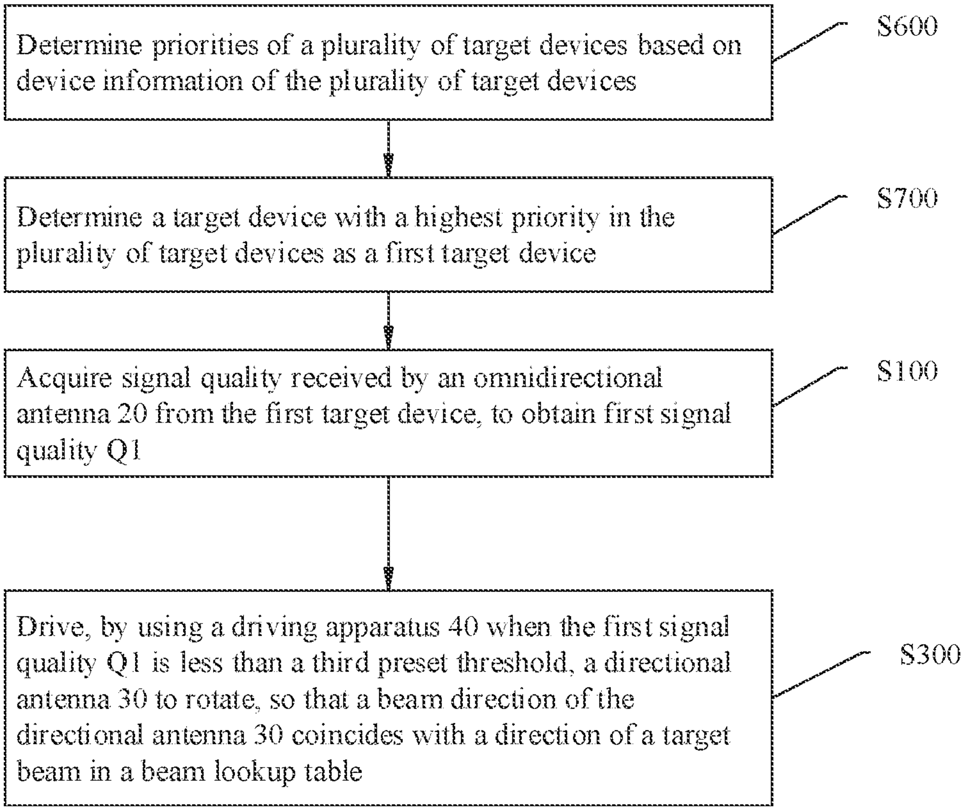
FIG. 29 is a flowchart of a control method of a wireless router according to some other embodiments of this application.

Specifically, FIG. 29 is a flowchart of a control method of a wireless router according to some other embodiments of this application. Before step S100 and step S200, the control method further includes step S600 and step S700.

Step S600: Determine priorities of a plurality of target devices based on device information of the plurality of target devices. The device information of the target device includes at least one of a network type, a device type, a wireless data request characteristic, or device use information, and the device use information includes at least one of a use time or a use probability. For example, a data volume of an Internet of Things (Internet of Things, IoT) device is small, and a priority of the Internet of Things device may be sorted backward. For another example, a smooth network needs to be preferentially ensured for a student online course device within a specific time period, and a priority of the student online course device may be sorted forward within the time period. According to a statistical rule of the devices, the wireless router identifies the following scenarios after performing autonomous learning for a specific time period: Which of these devices are iot devices, which of these devices are devices with a low delay and a large data volume (for example, a high-definition smart screen, an online course device, and a game device), which of these devices are edge devices, which of these devices are devices with fixed positions, and the like. A use habit of a user is understood based on an occurrence time, a probability, and the like of a device, to implement a multi-user priority sorting policy.

Step S700: Determine a target device with a highest priority in the plurality of target devices as the first target device.

In some embodiments, before step S600, the control method further includes: identifying target devices through polling by using the directional antenna 20 and/or the omnidirectional antenna 30, to obtain a plurality of target devices.

Some embodiments of this application further provide a computer storage medium. The computer storage medium includes but is not limited to any medium that can store program code, for example, a USB flash drive, a removable hard disk, a read-only memory (read-only memory, ROM), a random access memory (random access memory, RAM), a magnetic disk, or an optical disc. The computer storage medium includes computer instructions. When the computer instructions are run on the wireless router 100, the wireless router 100 is enabled to perform the control method described in any of the foregoing embodiments.

Some embodiments of this application further provide a computer program product. When the computer program product runs on a computer, the computer is enabled to perform the control method described in any of the foregoing embodiments.

The computer storage medium or the computer program product provided in the embodiments of this application is configured to perform the control method described in any of the foregoing embodiments. Therefore, for beneficial effects that can be achieved by the computer storage medium or the computer program product, refer to the beneficial effects of the corresponding control method described above. Details are not described herein again.

In the descriptions of this specification, specific features, structures, materials, or characteristics may be combined in any one or more embodiments or examples in a suitable manner.

Finally, it should be noted that the foregoing embodiments are only used to illustrate the technical solutions of this application, but are not used to limit this application. Although this application has been described in detail with reference to the foregoing embodiments, it should be understood by a person of ordinary skill in the art that the technical solutions described in the foregoing embodiments may still be modified, or some technical features thereof are equivalently replaced. These modifications or replacements do not make the essence of the corresponding technical solutions depart from the scope of the technical solutions of the embodiments of this application.

What is claimed is:

1. A wireless router, comprising:

an omnidirectional antenna;

a directional antenna; and a driving apparatus connected to the directional antenna, wherein the driving apparatus is configured to drive the directional antenna to rotate around a first axis, so that a beam direction of the directional antenna coincides with a direction of a target beam in a beam lookup table, wherein the target beam is capable of covering a target device, wherein the beam lookup table comprises a set formed by beams when the directional antenna rotates to a plurality of different orientations under driving by the driving apparatus, wherein a plurality of beams in the beam lookup table form a plurality of beam subsets arranged in a circumferential direction of the first axis, and each beam subset comprises at least a first beam having a direction that is perpendicular to the first axis, and wherein in the circumferential direction of the first axis, an included angle between first beams in two adjacent beam subsets is greater than or equal to a stepping precision angle of the driving apparatus to drive the directional antenna around the first axis, and is less than or equal to a first beam angle of the directional antenna.

2. The wireless router of claim 1, wherein the first beam angle is an included angle between two directions in which radiation powers decrease by a first preset threshold and that are located on two sides of a maximum radiation direction in a plane perpendicular to the first axis when the beam direction of the directional antenna is perpendicular to the first axis.

3. The wireless router of claim 1, wherein the driving apparatus is further configured to drive the directional antenna to rotate around a second axis that is perpendicular to the first axis and to the beam direction of the directional antenna, and wherein the beam subset comprises a plurality of beams arranged in a circumferential direction of the second axis, and the first beam is one of the plurality of beams.

4. The wireless router of claim 3, further comprising a second driving apparatus configured to drive the directional antenna to rotate around the second axis, wherein in the circumferential direction of the second axis, an included angle between two adjacent beams in the beam subset is greater than or equal to a stepping precision angle of the second driving apparatus to drive the directional antenna around the second axis, and is less than or equal to a second beam angle of the directional antenna, and wherein the second beam angle is an included angle between two directions in which radiation powers decrease by a second preset threshold and that are located on two sides of a maximum radiation direction in a plane perpendicular to the second axis when the beam direction of the directional antenna is perpendicular to the first axis.

5. The wireless router of claim 1, further comprising:

a controller that is electrically connected to the driving apparatus, wherein the controller is configured to control the driving apparatus to drive the directional antenna to sequentially rotate to the plurality of orientations, so that the beam direction of the directional antenna separately coincides with directions of the plurality of beams in the beam lookup table; and a detection system that is electrically connected to the controller, wherein the detection system is configured to detect a signal quality received by the directional antenna from the target device when the beam direction of the directional antenna separately coincides with the directions of the plurality of beams in the beam lookup table, wherein the target beam in the beam lookup table is based on a plurality of pieces of signal quality obtained by the detection system through detection, and wherein the controller is further configured to control the driving apparatus to drive the directional antenna to rotate, so that the beam direction of the directional antenna coincides with the direction of the target beam in the beam lookup table.

6. The wireless router of claim 1, further comprising:

a positioning apparatus configured to acquire position information of the target device; and a controller that is electrically connected to the positioning apparatus, wherein the controller is configured to control the driving apparatus to drive the directional antenna to rotate, so that the beam direction of the directional antenna coincides with the direction of the target beam in the beam lookup table, wherein the target beam in the beam lookup table is based on the position information acquired by the positioning apparatus.

7. The wireless router of claim 6, wherein the positioning apparatus is an ultra-wideband (UWB) antenna.

8. The wireless router of claim 1, wherein the wireless router includes at least one omnidirectional antenna and at least one directional antenna, wherein the router further comprises:

a radio frequency transceiver system having a plurality of signal output ends, wherein a sum of a quantity of omnidirectional antennas and a quantity of directional antennas is greater than a quantity of signal output ends of the radio frequency transceiver system; and a toggle switch disposed between the plurality of signal output ends of the radio frequency transceiver system and both of the omnidirectional antenna and the directional antenna, wherein the toggle switch is configured to select the plurality of signal output ends of the radio frequency transceiver system to be respectively electrically connected to a plurality of antennas from the at least one omnidirectional antenna and the at least one directional antenna.

9. A method, comprising:

obtaining a first signal quality based on a signal quality received by an omnidirectional antenna of a wireless router from a first target device; and driving a directional antenna of the wireless router to rotate around a first axis when the first signal quality is less than a third preset threshold, so that a beam direction of the directional antenna coincides with a direction of a target beam in a beam lookup table, wherein the target beam is capable of covering the first target device, wherein the beam lookup table comprises a set formed by beams when the directional antenna is driven to rotate to a plurality of different orientations, wherein the plurality of beams in the beam lookup table form a plurality of beam subsets arranged in a circumferential direction of the first axis, and each beam subset comprises at least a first beam having a direction that is perpendicular to the first axis, and wherein in the circumferential direction of the first axis, an included angle between first beams in two adjacent beam subsets is greater than or equal to a stepping precision angle by which the directional antenna is driven around the first axis, and is less than or equal to a first beam angle of the directional antenna.

10. The method of claim 9, further comprising identifying the target beam in the beam lookup table before driving the directional antenna to rotate.

11. The method of claim 10, wherein identifying the target beam in the beam lookup table comprises:

driving the directional antenna to rotate to the plurality of orientations, so that the beam direction of the directional antenna coincides with directions of a plurality of beams in the beam lookup table; and detecting, when the beam direction of the directional antenna coincides with the directions of the plurality of beams in the beam lookup table, a signal quality received by the directional antenna from the first target device, to obtain a plurality of pieces of signal quality, wherein the target beam in the beam lookup table is based on the plurality of pieces of signal quality.

12. The method of claim 11, wherein driving the directional antenna to rotate to the plurality of orientations and detecting the signal quality received by the directional antenna further comprises:

driving the directional antenna to rotate around the first axis, so that the beam direction of the directional antenna coincides with directions of the first beams in the plurality of beam subsets; and detecting, when the beam direction of the directional antenna coincides with the directions of the first beams in the plurality of beam subsets, the signal quality received by the directional antenna from the first target device, to obtain a plurality of pieces of third signal quality, wherein a target beam subset is based on the plurality of pieces of third signal quality, and the target beam belongs to the target beam subset.

13. The method of claim 12, wherein the directional antenna is also driven to rotate around a second axis that is perpendicular to the first axis, and to the beam direction of the directional antenna, wherein the beam subset comprises a plurality of beams arranged in a circumferential direction of the second axis, and the first beam is one of the plurality of beams, and wherein driving the directional antenna to rotate to the plurality of orientations and detecting the signal quality received by the directional antenna from the first target device further comprises:

driving the directional antenna to rotate around the second axis, so that the beam direction of the directional antenna coincides with directions of a plurality of beams in the target beam subset; and detecting, when the beam direction of the directional antenna coincides with the directions of the plurality of beams in the target beam subset, the signal quality received by the directional antenna from the first target device, to obtain a plurality of pieces of fourth signal quality, wherein the target beam in the target beam subset is based on the plurality of pieces of fourth signal quality.

14. The method of claim 10, further comprising acquiring position information of the first target device, wherein the target beam in the beam lookup table is based on the position information.

15. The method of claim 9, wherein after obtaining the first signal quality, the method further comprises covering, by the omnidirectional antenna, the first device for operating when the first signal quality is greater than or equal to the third preset threshold.

16. The method of claim 9, further comprising obtaining a second signal quality based on a signal quality received by the directional antenna from the first target device, wherein driving the directional antenna to rotate further comprises driving, when the first signal quality is less than the third preset threshold and the second signal quality is less than a fourth preset threshold, the directional antenna to rotate, so that the beam direction of the directional antenna coincides with the direction of the target beam in the beam lookup table.

17. The method of claim 16, wherein acquiring the signal quality received by the directional antenna from the first target device comprises acquiring the signal quality received by the directional antenna from the first target device when the first signal quality is less than the third preset threshold.

18. The method of claim 16, wherein after the second signal quality is obtained, the method further comprises covering, by the directional antenna in a current beam direction, the first target device for operating when the second signal quality is greater than or equal to the fourth preset threshold.

19. The method of claim 9, wherein after the beam direction of the directional antenna coincides with the direction of the target beam in the beam lookup table, the method further comprises covering, by the directional antenna with a switched beam direction, the first target device for operating.

20. The method of claim 9, wherein the first beam angle is an included angle between two directions in which radiation powers decrease by a first preset threshold and that are located on two sides of a maximum radiation direction in a plane perpendicular to the first axis when the beam direction of the directional antenna is perpendicular to the first axis.

* * * * *